US011465024B2

(12) United States Patent
Hernandez

(10) Patent No.: US 11,465,024 B2
(45) Date of Patent: Oct. 11, 2022

(54) CATTLE ROPING TRAINING DUMMY

(71) Applicant: Jesus Edwardo Hernandez, Wilcox, AZ (US)

(72) Inventor: Jesus Edwardo Hernandez, Wilcox, AZ (US)

( * ) Notice: Subject to any disclaimer, the term of this patent is extended or adjusted under 35 U.S.C. 154(b) by 0 days.

(21) Appl. No.: 16/934,096

(22) Filed: Jul. 21, 2020

(65) Prior Publication Data
US 2022/0023733 A1    Jan. 27, 2022

(51) Int. Cl.
*A63B 69/00* (2006.01)
*A63B 69/04* (2006.01)
*A01K 15/00* (2006.01)
*A01K 15/02* (2006.01)

(52) U.S. Cl.
CPC ......... *A63B 69/0068* (2013.01); *A01K 15/02* (2013.01); *A63B 69/04* (2013.01)

(58) Field of Classification Search
CPC ..... A63B 69/00; A63B 69/04; A63B 69/0068; A01K 15/02; A01K 15/003
USPC ........................................................ 273/359
See application file for complete search history.

(56) References Cited

U.S. PATENT DOCUMENTS

| | | | | | |
|---|---|---|---|---|---|
| 4,136,874 | A | * | 1/1979 | McCord | A63B 69/0068 273/339 |
| 4,874,179 | A | * | 10/1989 | Henderson | A63B 69/0068 273/338 |
| 5,009,432 | A | * | 4/1991 | Richard | A63B 69/0068 273/339 |
| 6,497,411 | B1 | * | 12/2002 | Nelson | A63B 69/0068 273/336 |
| 7,293,775 | B1 | * | 11/2007 | Donnelly | A01K 15/003 119/839 |
| 9,808,695 | B1 | * | 11/2017 | Copenhaver | A01K 15/02 |
| 10,471,327 | B1 | * | 11/2019 | Imahata | A63B 69/0091 |
| 2005/0072340 | A1 | * | 4/2005 | Shabram | A47B 3/0912 108/35 |
| 2006/0170163 | A1 | * | 8/2006 | Perkins | A63B 69/0068 273/359 |
| 2007/0187996 | A1 | * | 8/2007 | Shabram | A47C 4/52 297/16.1 |
| 2007/0284377 | A1 | * | 12/2007 | Chandler | A63B 69/0068 220/592.2 |

(Continued)

*Primary Examiner* — John E Simms, Jr.
(74) *Attorney, Agent, or Firm* — Eugene Vamos

(57) ABSTRACT

A cattle roping training dummy (90) that allows a "header" and a "heeler" to practice roping the head of the cattle roping training dummy (90), the hind legs (175) of the cattle roping training dummy (90), or a combination of the head and the hind legs (175) is described. The cattle roping training dummy (90) comprises a frame (100), a spring (200), a supporting structure (300) and a base (400). The cattle roping training dummy (90) may further comprise a means to actuate side release lever (500). When the frame (100) is released, the spring (200) gives the frame (100) an initial jerk as the frame (100) and provides rotational motion around the supporting structure (300). This jerking motion mimics a live steer that has been roped on the horns or head and is jerked sideways as the cowboy pulls the steer to the left. The cattle roping training dummy (90) also provides the "heeler" with the opportunity to practice alone. The cattle roping training dummy (90) provides the convenience of: a) quick fold up for easy moving and storing, and b) quick setup.

20 Claims, 15 Drawing Sheets

(56) References Cited

U.S. PATENT DOCUMENTS

| | | | |
|---|---|---|---|
| 2016/0029596 A1* | 2/2016 | Bruegman | A01K 15/02 |
| | | | 119/839 |
| 2018/0116176 A1* | 5/2018 | Bach | A63B 71/0622 |
| 2018/0272216 A1* | 9/2018 | Love | A63B 21/0058 |
| 2018/0320415 A1* | 11/2018 | Yang | E05B 13/103 |
| 2018/0369641 A1* | 12/2018 | Saunders | A63B 23/04 |
| 2021/0177133 A1* | 6/2021 | Thompson | A47B 13/08 |

\* cited by examiner

CATTLE ROPING TRAINING DUMMY

CROSS-REFERENCE TO RELATED APPLICATIONS

Not Applicable

STATEMENT REGARDING FEDERALLY SPONSORED RESEARCH/DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM

Not Applicable

STATEMENT REGARDING PRIOR DISCLOSURES BY AN INVENTOR OR JOINT INVENTOR

Not Applicable

BACKGROUND OF THE INVENTION

Field Of Invention

The present invention generally relates to the field of cattle roping practice devices.

Description of Related Art

Cattle roping is an essential skill for actual working cowboys; cattle roping is used to catch and restrain cattle for branding or medical treatment. Ranch hands took pride in the speed with which they could rope and tie cattle, soon turning their work into informal contests. These informal contests have evolved into formal events, which currently include a professional rodeo circuit involving steers and calves.

To develop these cattle roping skills, a number of devices ("roping dummies") have been developed to help the cattle rancher and pro rodeo cowboy alike.

These roping dummies are designed to be roped (or "lassoed"); they simulate the experience of cattle roping with a body shape, including the head of a cattle, that simulates cattle shape and movements that a cowboy encounters.

The simplest of these devices might a post, or a piece of wood with two attached horns.

More complicated in design, the body of the Lil Blue Heeler swivels around a base and has two motorized legs. The head is connected to the torso. The movement of the torso and legs are not dependent on the roped state of the head of the dummy. Other prior art that adopt this design include:

US 20060170163A1 Roping training device speed roper
US 20180116176A1 Roping Practice Apparatus
U.S. Pat. No. 4,874,179 Mechanical roping dummy
U.S. Pat. No. 9,808,695B1 Steer roping practice apparatus with improved leg gait The head of the RopeSmart Steer Roping Dummy—The Smart ONE swivels clockwise and counterclockwise. Its body is mounted on two skids. The legs only pivot if they have been roped. The movement of the torso and legs are not dependent on the roped state of the head of the dummy.

The head of the Cruz Fire Elite swivels left and right. U.S. Pat. No. 7,293,775B1 Roping practice apparatus further comprises a mechanism that actuates the movement of two legs. However, the movement of the head is independent to the movement that actuates the movement of the two legs.

Technical Problems

The prior art solutions provide for a very limited simulation on how cattle might move as they are roped. The prior art solutions provide for predictable movements and do not simulate a credible sequence of cattle body, in particular hind leg, movements. For instance, prior art might allow:

The head of the roping dummy to swivel horizontally.
The body of the roping dummy to swivel horizontally.
The hind legs of the roping dummy to swivel vertically.

However, in reality, when being roped, cattle behave and move unpredictably and erratically, especially their torsos and hind legs. In particularly, a calf or steer throws about its body only when it has been roped around its head/horns. In other words, the movement of the body, in particular the hind legs, is dependent on whether the horns have been roped. This feature is not present in the prior art.

Furthermore, the prior art solutions, especially ones that provide more complex movements, tend to be bulky and hard to transport. They are normally attached to the back of a pick up truck or pushed by hand. Their designs do not allow for easy stowage and transport from one location to the other, limiting the usability of these roping dummies, especially by cowboys that are constantly on the road but need roping practice—for example, the professional rodeo cowboy.

Solution Approaches

To overcome these shortcomings:
Cattle roping training dummies need to simulate the unpredictable and erratic movements of cattle while they are being roped.
The movement of the torso and the hind legs should be dependent on whether the head has been roped.
The cattle roping training dummy needs to accommodate easy stowage and transportation from one location to the other.

BRIEF SUMMARY OF THE INVENTION

The cattle roping training dummy (90) comprises of a frame (100), a spring (200), a supporting structure (300), and a base (400). The cattle roping training dummy (90) may further comprise a means to actuate side release lever (500).

The cattle roping training dummy (90) allows a cowboy to practice roping the head of the cattle roping training dummy (90), the hind legs of the cattle roping training dummy (90), or a combination of the head and the hind legs of the cattle roping training dummy (90). It also provides the convenience of: a) quick fold up for easy moving and storing, and b) quick setup. This practice is suited for skill training for actual working cowboys or for rodeo cowboys training for various rodeo competition events such as team roping (heading and heeling), tie down roping, and breakaway roping.

For team roping, the first roper is known as the "header." This "header" ropes the head of the steer, normally somewhere near the horns. Once the steer has been captured in front, the "header" will turn the steer around so its hind legs can be roped by the second roper, known as the "heeler." The cattle roping training dummy (90) provides an opportunity for the "header" to rope the head, and the "heeler" to rope the hind legs (175).

Novel features of the cattle roping training dummy (90) include:

First, when a lasso from the "header" ropes the front assembly (110) (the "head") of the frame (the "body"), a front release lever (120) is actuated, releasing the frame (100) of the cattle roping training dummy (90) from a spring-loaded position. The spring (200) gives the frame (100) an initial jerk and provides the frame (100) with rotational motion around the supporting structure (300). This jerking motion mimics a live steer that has been roped on the horns or head and is jerked sideways as the "header" pulls the steer to the left. This jerking motion is accomplished through the release of a frame (100) loaded with a spring (200). As the frame (100) rotates, the hind legs (175) swing freely giving the "heeler" the opportunity to practice his timing and speed while lassoing the hind legs (175).

Second, the cattle roping training dummy (90) provides the "heeler" with the opportunity to practice alone with the aid of a device that releases the frame (100)—means to actuate side release lever (500). The means to actuate side release lever (500) takes the place of the "header" roping the head of the cattle roping training dummy (90). The means to actuate side release lever (500) actuates a side release lever (320), instantly releasing the frame (100) (the "body") of the cattle roping training dummy (90) from its spring-loaded position. Once the frame (100) is rotating, the hind legs (175) move up and down and give the "heeler" the opportunity to practice his timing and speed when attempting lassoing the hind legs (175).

Third, the cattle roping training dummy (90) provides the convenience of: a) quick fold up for easy moving and storing, and b) quick setup.

DEFINITIONS member—a part, either solid or hollow, that is longer than wider, with sufficient rigidity to provide mechanical strength.

DETAILED DESCRIPTION OF THE INVENTION

Figure 1:
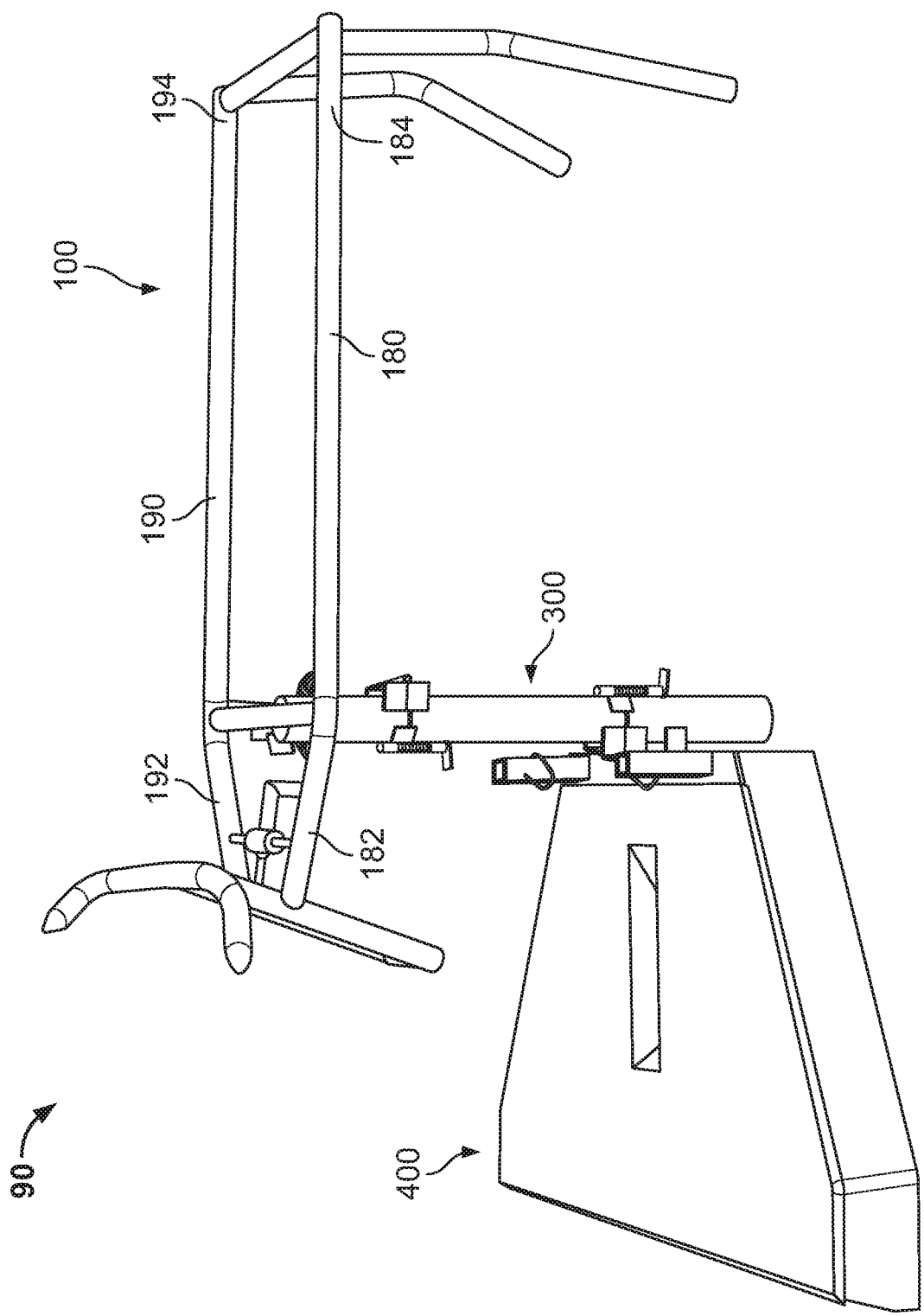
FIG. 1 is a perspective view of the cattle roping training dummy (90) in its released position.

The cattle roping training dummy (90) comprises a frame (100), a spring (200), a supporting structure (300), and a base (400). The cattle roping training dummy (90) may further comprise a means to actuate side release lever (500).

The cattle roping training dummy (90) allows a cowboy to practice roping the head of the cattle roping training dummy (90), the hind legs (175) of the cattle roping training dummy (90), or a combination of the head and the hind legs (175) of the cattle roping training dummy (90). This practice is suited for skill training for actual working cowboys or for rodeo cowboys training for various rodeo competition events such as team roping (heading and heeling), tie down roping, and breakaway roping. For team roping training, the dummy provides an opportunity for the "header" to rope the head and the "heeler" to rope the hind legs (175).

Figure 3:
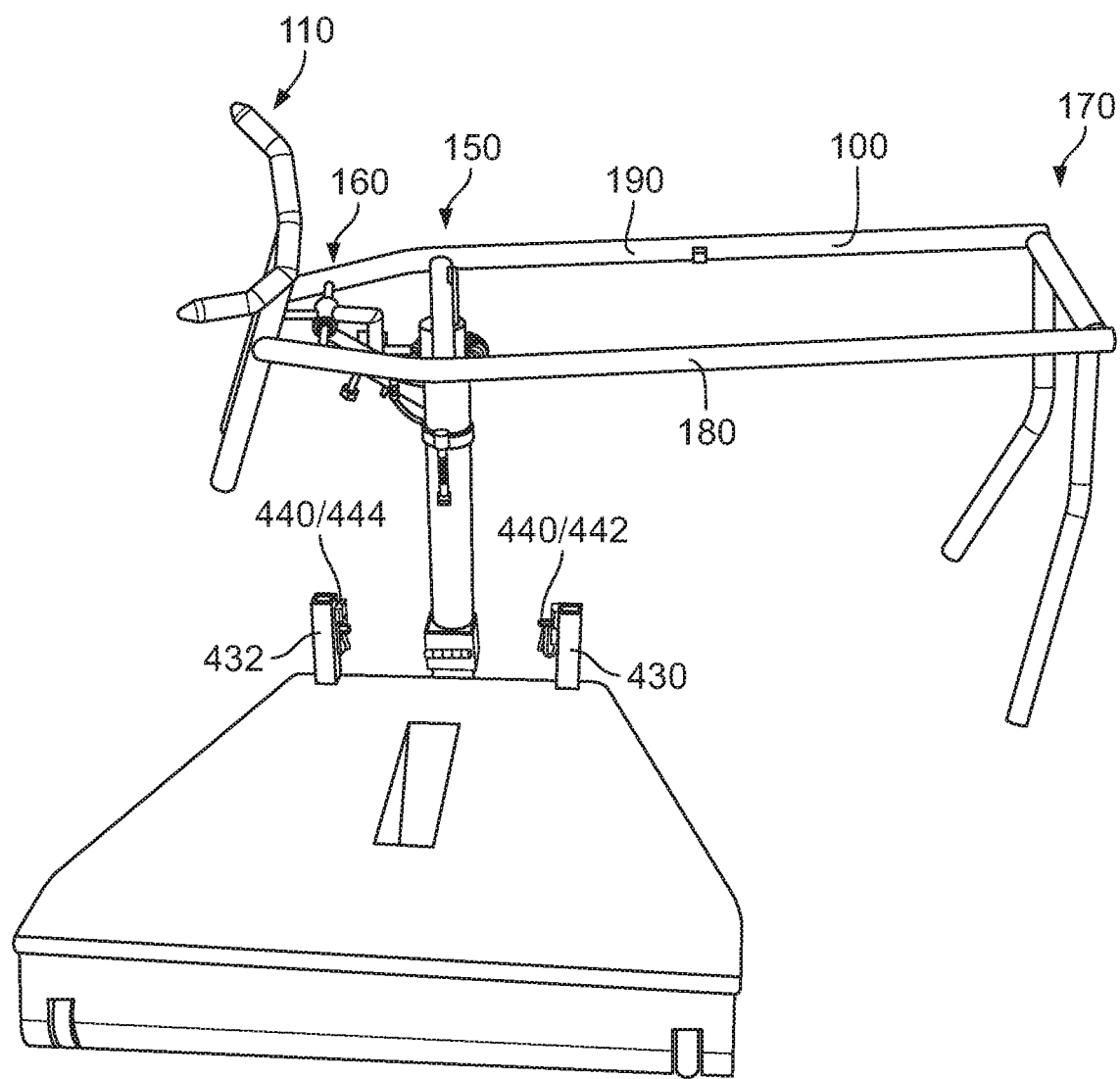
FIG. 3 is a perspective view of the cattle roping training dummy (90) in its spring-loaded position. A left mount (430) and a right mount (432) are connected to the housing (410). A first means to lock frame to base (442) is connected to the left mount (430) and a second means to lock frame to base (444) is connected to the right mount (432). The frame (100) comprises a front assembly (110), a mid assembly (150), a back assembly (170), a mid release lever (160), a left side member (180), a right side member (190).

To practice, the cowboy rotates the frame (100) from a released position to a spring-loaded position. FIG. 1 shows the frame (100) in the released position. FIG. 3 shows the frame (100) in the spring-loaded position. The rotation of the frame (100) allows a spring (200) to be loaded, storing mechanical energy. When the "header" ropes the head of the cattle roping training dummy (90), the frame (100) is released from its spring-loaded position and the spring (200) rotates the frame (100) back to its released position. The frame (100) can be manually released through a means to actuate side release lever (500). The frame (100) rotates back and forth between the released position and the spring-loaded position until all the mechanical energy is dissipated and the frame (100) comes to a halt. When the frame (100) rotates back and forth, the "heeler" has the opportunity to rope the hind legs (175) of the cattle roping training dummy (90). The hind legs (175)—the right leg (178) and the left leg (176)—have the ability to swing up and down, simulating the hind leg motion of bucking cattle.

Frame (100)

The frame (100) is a structure that simulates the body of a cattle, which includes the roping targets, that is, the front assembly (110) (the "head") and the hind legs (175).

The frame (100) comprises a front assembly (110), a mid assembly (150), a back assembly (170), a mid release lever (160), a front release lever (120), a left side member (180), and a right side member (190). FIG. 3 is a perspective view of the frame (100) in its spring-loaded position, comprising a front assembly (110), a mid assembly (150), a back assembly (170), a mid release lever (160), a left side member (180), a right side member (190).

Rolling-Element Bearings (700)

The rotation of various frame parts maybe enhanced with the use of rolling-element bearings (700). Each rolling-element bearing (700) is comprised of an inner race (702), an outer race (704), and rolling elements (706). The rolling elements (706) lie between the inner race (702) and the outer race (704).

These rolling-element bearings (700) are adapted to be used in various frame parts, including one or more hollow cylinder rolling-element bearings (710), one or more top supporting shaft rolling-element bearings (720), and one or more back assembly rolling-element bearings (730).

Each hollow cylinder rolling-element bearings (710) comprises an inner race (712), an outer race (714), and rolling elements (716). Each top supporting shaft rolling-element bearings (720) comprises an inner race (722), an outer race (724), and rolling elements (726). Each back assembly rolling-element bearings (730) comprises an inner race (732), an outer race (734), and rolling elements (736).

Front Release Lever (120)

When actuated, the front release lever (120) releases the frame (100) from its spring-loaded position. The front release lever (120) comprises an effort end (122) and a load end (124).

Left Side Member (180) and Right Side Member (190)

The left side member (180) and the right side member (190) provide horizontal structural support to the frame (100). FIG. 1 is a perspective view of the frame (100) showing the left side member (180) and the right side member (190).

Front Assembly (110)

The front assembly (110) is a structure that simulates the head of a cattle.

Generic Front Assembly

Figure 2:
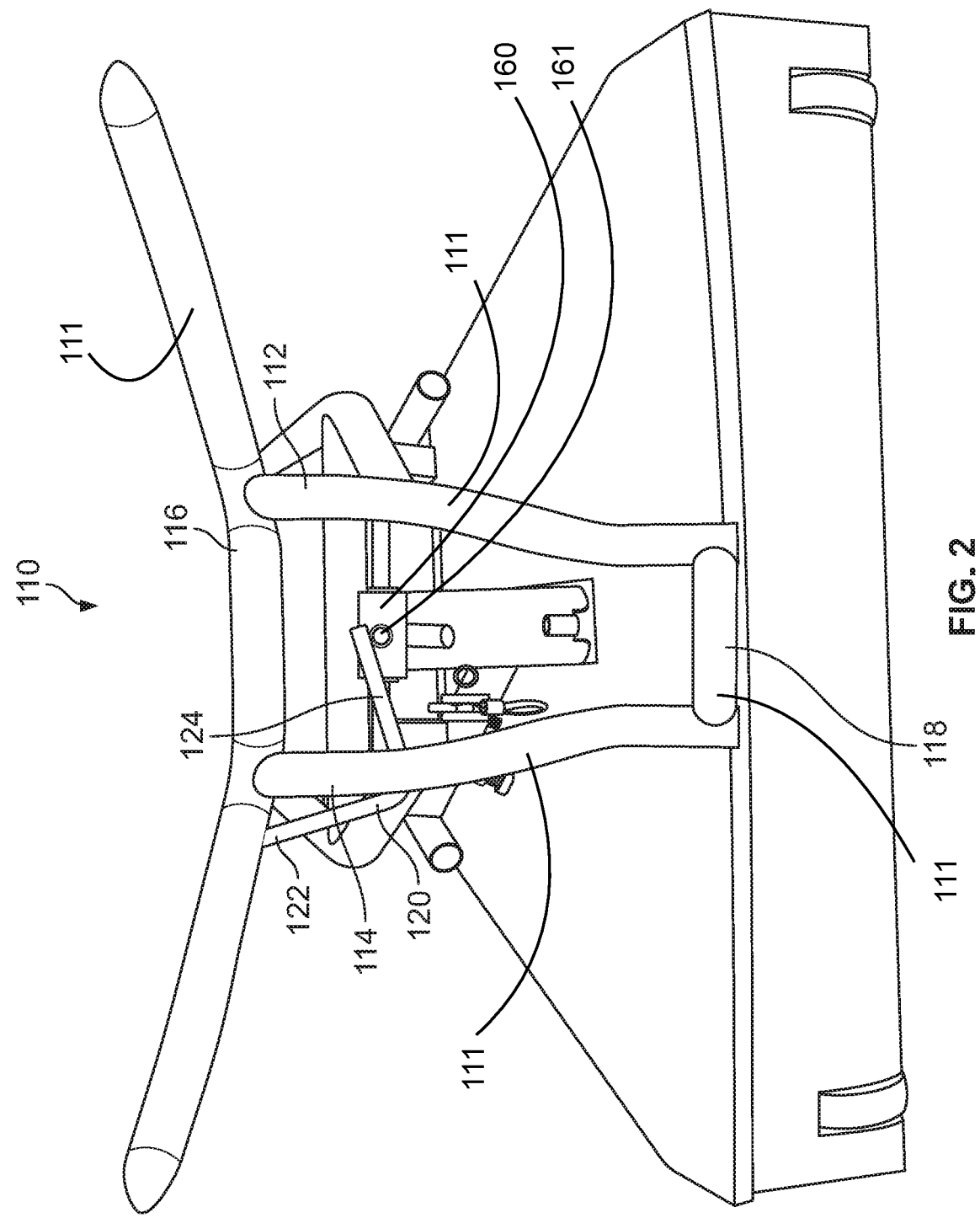
FIG. 2 is a front view of the front assembly (110), showing the front release lever (120) pivotally connected to the right vertical member (114).

The front assembly (110) may comprise one or more members (111). The front release lever (120) is pivotally connected to the front assembly (110). FIG. 2 is a front view of the front assembly (110), showing the front release lever (120) pivotally connected to the front assembly (110). One of the members (111), the top cross member (116), may be shaped to resemble cattle horns.

Figure 11:
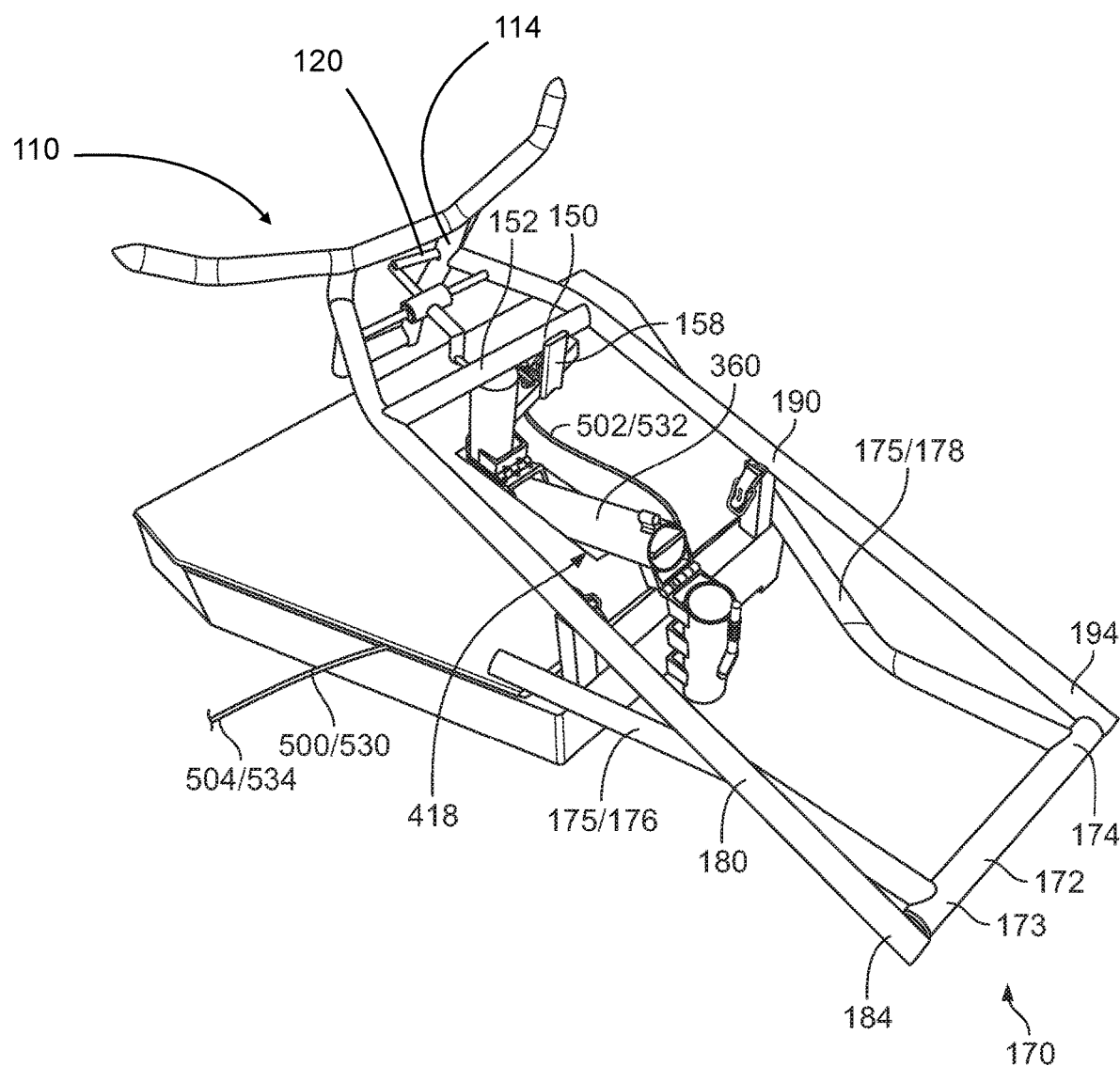
FIG. 11 is a back perspective view of the cattle roping training dummy (90) in its folded configuration, where the mid supporting shaft (360) fits within the recess (418). The back end (184) of the left side member (180) is pivotally connected to the left end (173) of the back cross member (172). The back end (194) of the right side member (190) is pivotally connected to the right end (174) of the back cross member (172).

The front release lever (120) can be pivotally connected to the outer surface of the front assembly (110). Alternatively, the front release lever (120) can be pivotally connected to the inner surface of the front assembly (110). FIG 11 is a back perspective view of the cattle roping training dummy (90) in its folded configuration, showing the front release lever (120) pivotally connected to the inner surface of the the front assembly (110).

The effort end (122) of the front release lever (120) is offset from the front assembly (110) so that the effort end (122) of the front release lever (120) moves toward the front assembly (110) when the lasso is placed around the effort end (122) of the front release lever (120) and the front assembly (110) and pulled tight, actuating the front release lever (120). FIG. 2 shows the front release lever pivotally connected to the front assembly (110) and the effort end (122) of the front release lever (120) offset from the front assembly (110).

The load end (124) of the front release lever (120) is placed so that the load end (124) of the front release lever (120) strikes the effort end (161) of the mid release lever (160) when the front release lever (120) is actuated. FIG. 2 shows the load end (124) of the front release lever (120) placed over the effort end (161) of the mid release lever (160) so that the load end (124) of the front release lever (120) strikes the effort end (161) of the mid release lever (160) when the front release lever (120) is actuated.

The front end (182) of the left side member (180) is connected to the front assembly (110). The front end (192) of the right side member (190) is connected to the front assembly (110).

When the cowboy places a lasso around the front assembly (110) and the effort end (122) of the front release lever (120) and pulls the lasso tight, the lasso actuates the effort end (122) of the front release lever (120), moving the effort end (122) towards the front assembly (110). The front release lever (120) pivots around the pivoted connection and the load end (124) of the front release lever (120) moves down. When the load end (124) of the front release lever (120) moves down, it strikes the effort end (161) of the mid release lever (160). This causes the effort end (161) of the mid release lever (160) to move down, and the mid release lever (160) to pivot around its pivoted connection. This, in turn, causes the load end (162) of the mid release lever (160) to move up.

Figure 10:
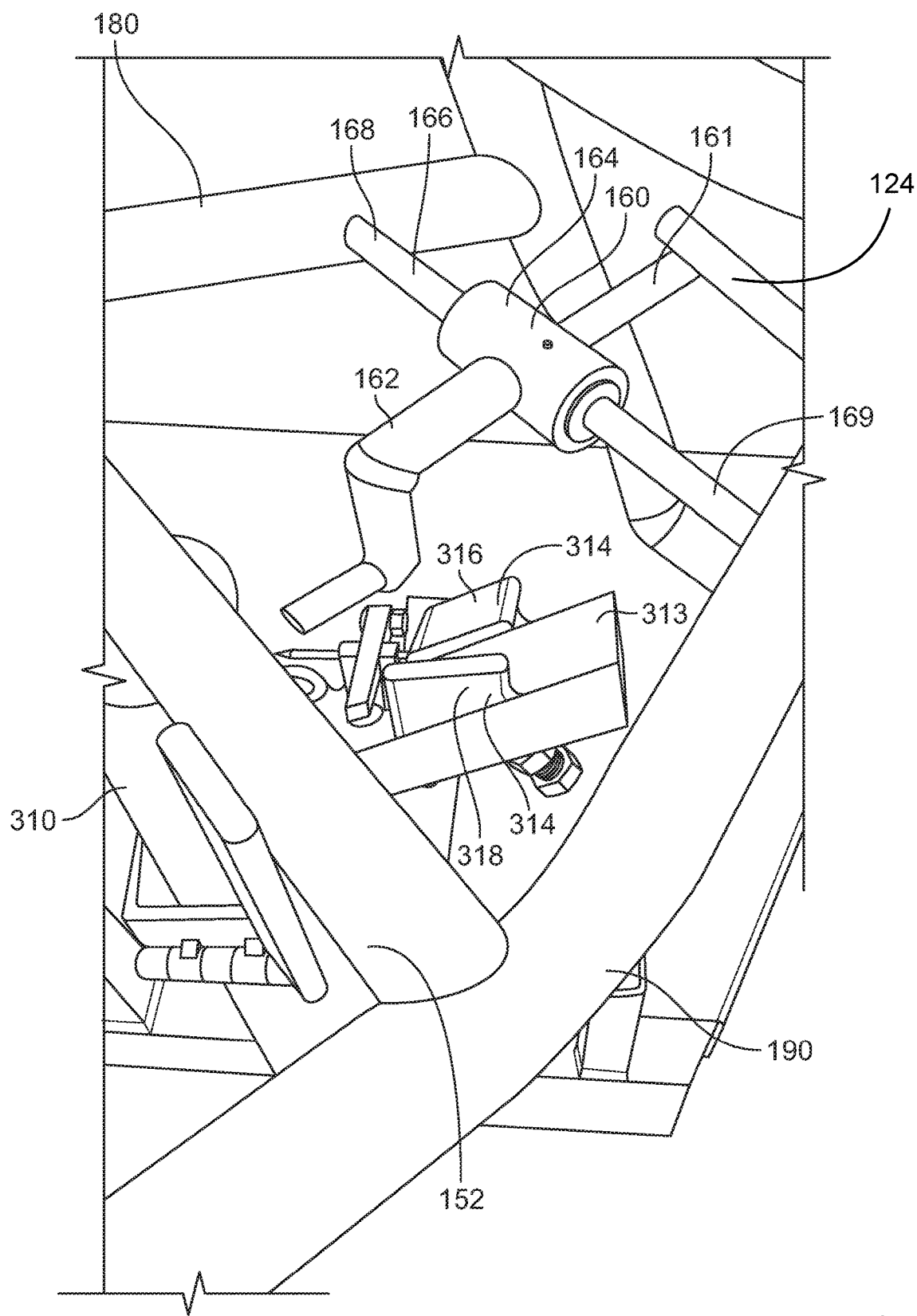
FIG. 10 is a perspective view of the mid release lever (160) and the platform (313) as the mid release lever (160) has been released from the catch (314).

FIG. 10 is a perspective view of the mid release lever (160) and the platform (313) as the mid release lever (160) has been released from the catch (314); the load end (124) of the front release lever (120) has moved down, striking the effort end (161) of the mid release lever (160).

Embodiment of Front Assembly

As an embodiment, the front assembly (110) may comprise a left vertical member (112), a right vertical member (114), and a top cross member (116). The front assembly (110) may also further comprise a bottom cross member (118). The front release lever (120) is pivotally connected to either the left vertical member (112) or the right vertical member (114). FIG. 2 is a front view of the front assembly (110), showing the front release lever (120) pivotally connected to the right vertical member (114).

The front release lever (120) can be pivotally connected to the outer surface of either the left vertical member (112) or the right vertical member (114). Alternatively, the front release lever (120) can be pivotally connected to the inner surface of either the left vertical member (112) or the right vertical member (114). FIG 11 is a back perspective view of the cattle roping training dummy (90) in its folded configuration, showing the front release lever (120) pivotally connected to the inner surface of the right vertical member (114).

The effort end (122) of the front release lever (120) is offset from either the left vertical member (112) or the right vertical member (114) so that the effort end (122) of the front release lever (120) moves towards the front assembly when the lasso is placed around the effort end (122) of the front release lever (120) and the front assembly (110) and pulled tight, actuating the front release lever (120). FIG. 2 shows the front release lever pivotally connected to the right vertical member (114) of the front assembly (110) and the effort end (122) of the front release lever (120) offset from the the right vertical member (114) of the front assembly (110).

The load end (124) of the front release lever (120) is placed so that the load end (124) of the front release lever (120) strikes the effort end (161) of the mid release lever (160) when the front release lever (120) is actuated. FIG. 2 shows the load end (124) of the front release lever (120) placed over the effort end (161) of the mid release lever (160) so that the load end (124) of the front release lever (120) strikes the effort end (161) of the mid release lever (160) when the front release lever (120) is actuated.

The front end (182) of the left side member (180) is connected to the left vertical member (112) of the front assembly (110). The front end (192) of the right side member (190) is connected to the right vertical member (114) of the front assembly (110).

The top cross member (116) is connected to the left vertical member (112) and the right vertical member (114). The top cross member (116) extends past the left vertical member (112) and the right vertical member (114). The top cross member (116) may be shaped to resemble cattle horns. This allows the cowboy to practice roping a cattle head.

The bottom cross member (118) is connected to the left vertical member (112) and the right vertical member (114).

When the cowboy places a lasso around the front assembly (110) and the effort end (122) of the front release lever (120) and pulls the lasso tight, the lasso actuates the effort end (122) of the front release lever (120), moving the effort end (122) towards either the left vertical member (112) or the right vertical member (114). The front release lever (120) pivots around the pivoted connection and the load end (124) of the front release lever (120) moves down. When the load end (124) of the front release lever (120) moves down, it strikes the effort end (161) of the mid release lever (160). This causes the effort end (161) of the mid release lever (160) to move down, and the mid release lever (160) to pivot around its pivoted connection. This, in turn, causes the load end (162) of the mid release lever (160) to move up.

FIG. 10 is a perspective view of the mid release lever (160) and the platform (313) as the mid release lever (160) has been released from the catch (314); the load end (124) of the front release lever (120) has moved down, striking the effort end (161) of the mid release lever (160).

Mid Assembly (150)

The mid assembly (150) comprises a mid-cross member (152) and a rotation limiting plate (158).

Figure 8:
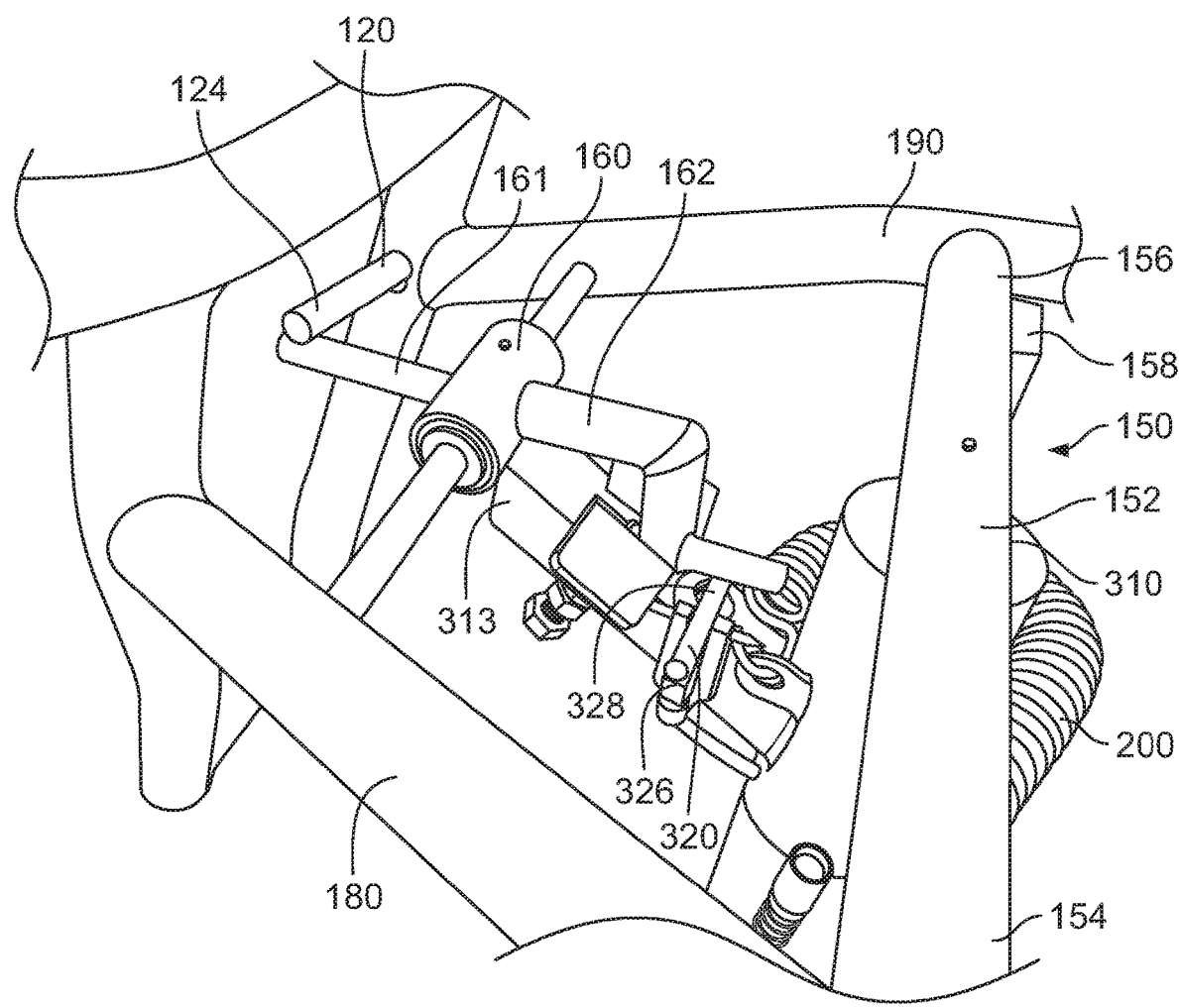
FIG. 8 is a perspective view of the mid release lever (160) and the platform (313) with the mid release lever (160) fixed in place by the catch (314). The cattle roping training dummy (90) is in its spring-loaded position and the spring (200) is in a full loaded state. The side release lever (320) is pivotally connected to the platform (313).

The mid-cross member (152) comprises a right end (154) and a left end (156). The mid-cross member (152) is pivotally connected to the top supporting shaft (310). This pivoted connection allows the frame (100) to rotate about the supporting structure (300). The left end (156) of the mid-cross member (152) is connected to the left side member (180). The right end (154) of the mid-cross member (152) is connected to the right side member (190). FIG. 8 is a perspective view of the mid assembly (150), comprising a mid-cross member (152) and a rotation limiting plate (158); the mid-cross member (152) comprises a right end (154) and a left end (156); the mid-cross member (152) is pivotally connected to the top supporting shaft (310).

Figure 15:
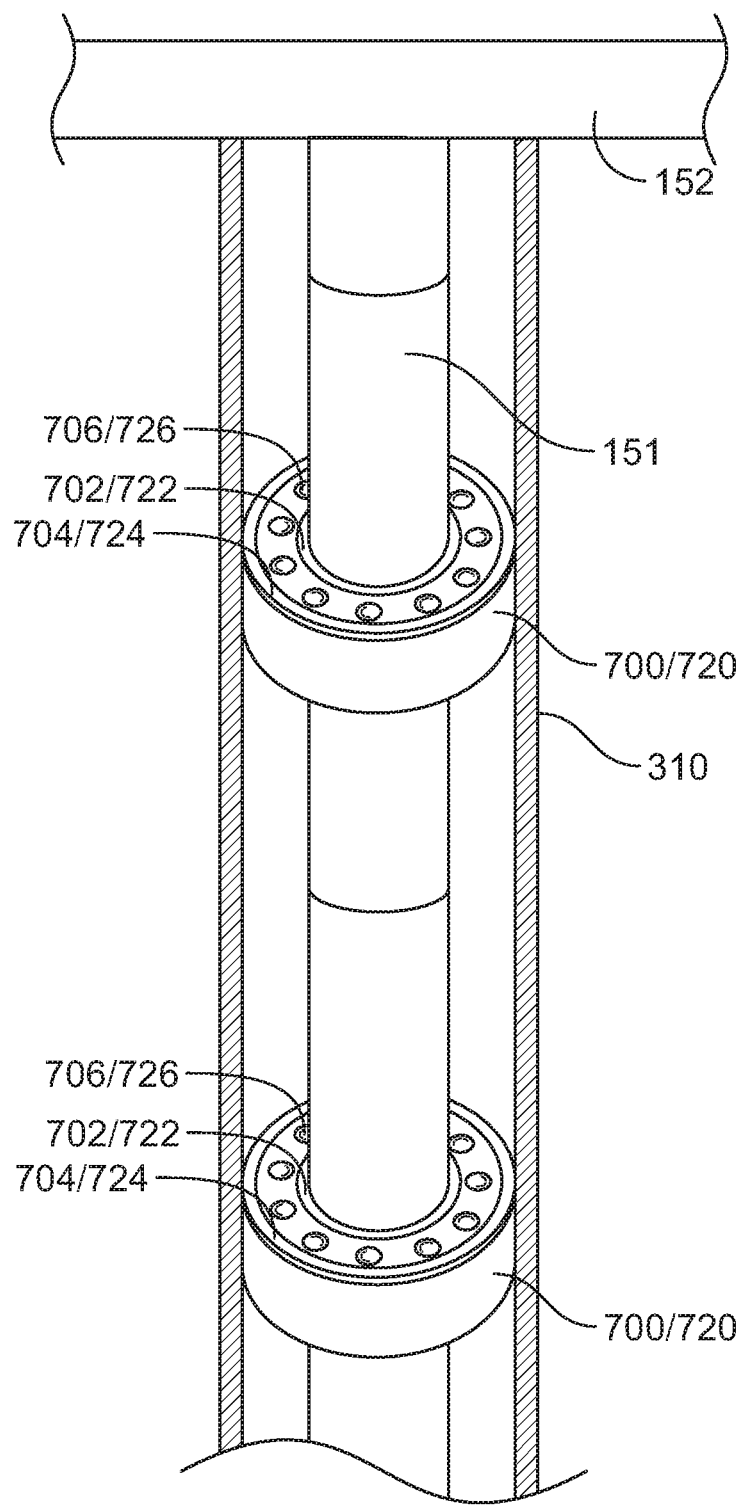
FIG. 15 is a perspective sectional view of the top supporting shaft (310), showing two top supporting shaft rolling-element bearings (720) connecting the top supporting shaft (310) to the mid assembly shaft (151).

The pivoted connection between the mid-cross member (152) and the top supporting shaft (310) may comprise a mid-assembly shaft (151) and one or more top supporting shaft rolling-element bearings (720). The mid-assembly shaft (151) is connected to the mid-cross member (152) and to the inner race (722) of each of the one or more top supporting shaft rolling-element bearings (720). The top supporting shaft (310) is connected to the outer race (724) of each of the one or more top supporting shaft rolling-element bearings (720). FIG. 15 is a perspective sectional view of the top supporting shaft (310), showing two top supporting shaft bearing elements (720) connecting the top supporting shaft (310) to the mid assembly shaft (151).

The rotation limiting plate (158) is connected to the mid-cross member (152) and positioned to strike the platform (313) when the frame (100) rotates from the spring-loaded position to the released position. The rotation limiting plate (158) prevents further rotational motion of the frame (100) past the platform (313); the rotation limiting plate (158) strikes the side of the platform (313) when the mid-cross member (152) rotates past the platform (313).

When the rotation limiting plate (158) strikes the side of the platform (313), the frame (100) bounces back, rotating in the opposite direction. The opposite direction rotation causes the spring (200) to come into load once again. Because of the friction inherent in the pivoted connection, the frame (100) does not fully rotate to the spring-loaded position but rather rotates to a position less than the spring-loaded position. The spring (200) then pulls the frame (100) back to the released position, the rotation limiting plate (158) striking once again against the side of the platform (313). This spring (200) tension and compression allows the frame (100) to oscillate back and forth until the friction inherent in the pivoted connection stops the frame's (100) rotational motion. The oscillation of the frame (100) realistically simulates the motion of a bucking cattle, making for improved roping practice.

Figure 4:
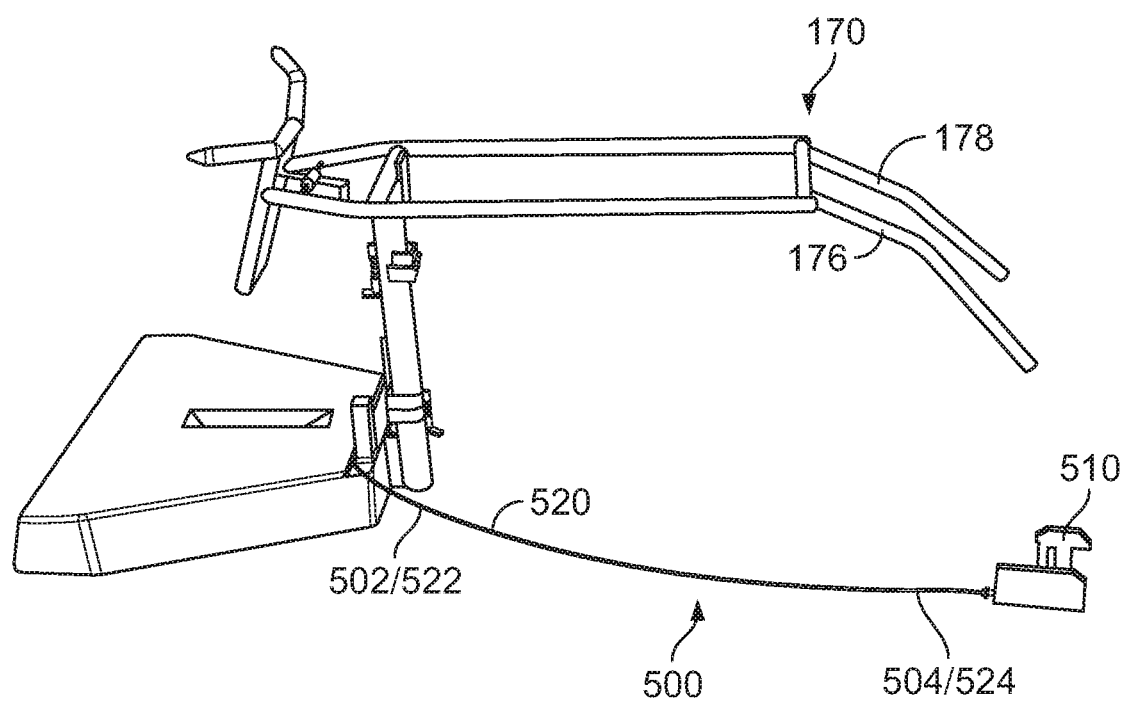
FIG. 4 is a perspective view of the cattle roping training dummy (90) in its released position with a means to actuate side release lever (500) connected. The means to actuate side release lever (500) comprises a mechanical cable assembly (520) and a pedal (510). The back end (184) of the left side member (180) is pivotally connected to the left end (173) of the back cross member (172). The back end (194) of the right side member (190) is pivotally connected to the right end (174) of the back cross member (172).

As the oscillation of the frame (100) occurs, the means to rotate the back cross member (600) allows the back cross member (172) to rotate relative to the left side member (180) and the right side member (190). This allows the back cross member (172) and the hind legs (175)—the left leg (176) and the right leg (178)—to rotate. This rotation allows the left leg (176) and the right leg (178) to rotate up towards the frame axis, simulating the up leg motion of bucking steer or calf. FIG. 4 shows the left leg (176) and the right leg (178) rotated up. The rotation may also allow the hind legs (175) to rotate down. This up and down motion simulates the motion of the legs of bucking bucking steer or calf, making for improved roping practice.

Mid Release Lever (160)

Figure 9:
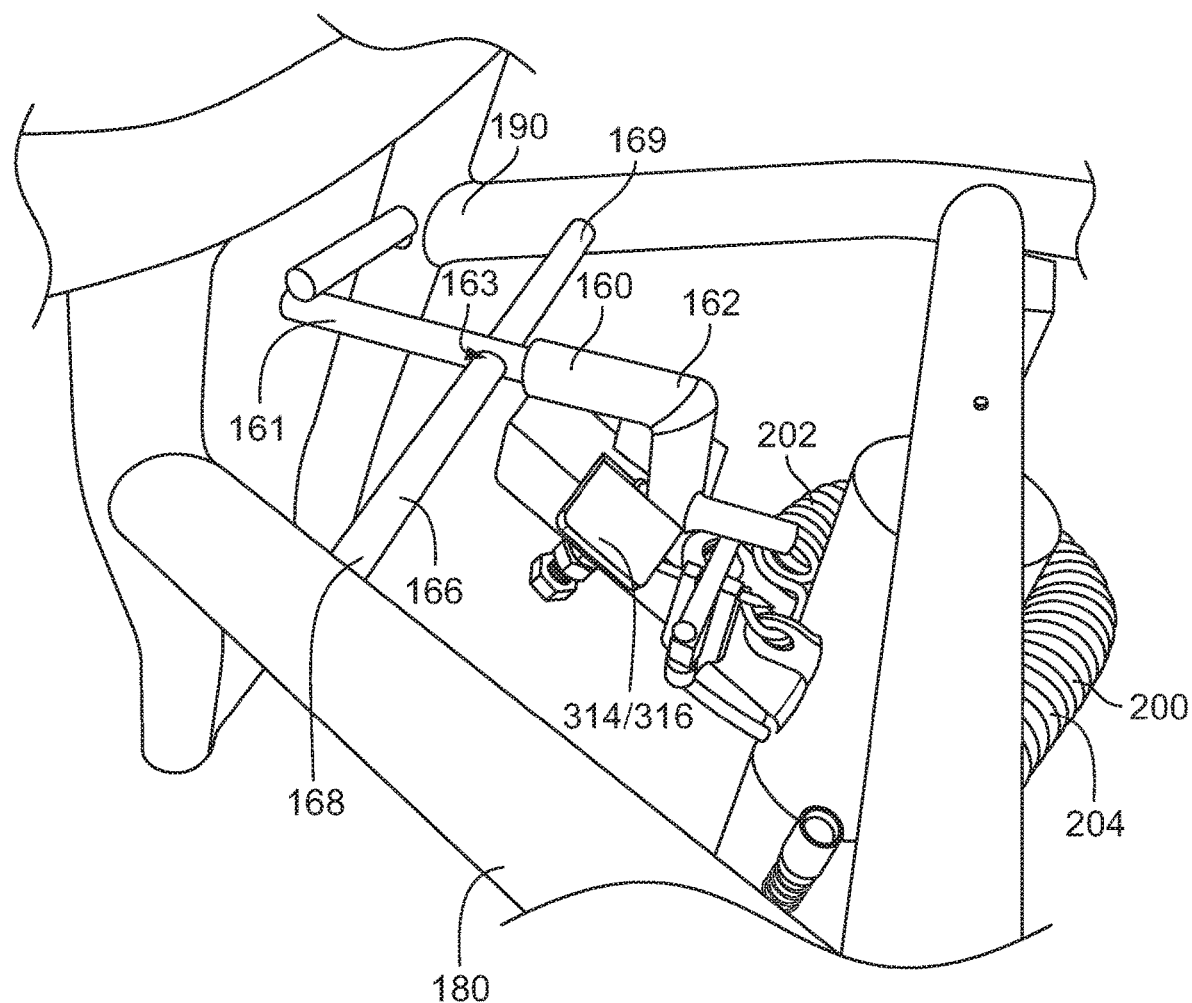
FIG. 9 is a perspective view of the mid release lever (160) and the platform (313) with the mid release lever (160) having a pivot hole (163) and the frame (100) having a mid release lever shaft (166) that is connected to the left side and the right side

The mid release lever (160) comprises an effort end (161) and a load end (162). The mid release lever (160) is pivotally connected to the frame (100). For example, the frame (100) maybe pivotally connected to the left side member (180) and the right side member (190). FIG. 9 shows the mid release lever (160) pivotally connected to the left side member (180) and the right side member (190).

The catch (314) fixes in place the load end (162) of the mid release lever (160) and fixes the frame (100) in its spring-loaded position, preventing rotational motion. The actuation of the mid release lever (160) allows the rotation of the frame (100) from its spring-loaded position to its released position.

When the effort end (161) of the mid release lever (160) moves down and the mid release lever (160) pivots around its pivoted connection, the load end (162) of the mid release lever (160) moves up. When the load end (162) of the mid release lever (160) moves up, it disengages from the catch (314), allowing the spring (200) to rotate the frame (100) from its spring-loaded position to its released position.

The pivoted connection between the mid release lever (160) and the left side member (180) and the right side member (190) may comprise having the frame (100) further comprise a mid release lever shaft (166) and having the mid release lever (160) further comprise a pivot hole (163). The mid release lever shaft (166) comprises a left end (168) and a right end (169). Either the left end (168), the right end (169) or both the left end (168) and the right end (169) are connected to the frame (100). For example, the left end (168) of the mid release lever shaft (166) is connected to the left side member (180), and the right end (169) of the mid release lever shaft (166) is connected to the right side member (190). The mid release lever shaft (166) projects through the pivot hole (163). FIG. 9 is a perspective view of the mid release lever (160) and the platform (313) with the mid release lever (160) having a pivot hole (163) and the frame (100) having a mid release lever shaft (166) that is connected to the left side and the right side.

The pivoted connection between the mid release lever (160) and the frame (100) may comprise having the frame (100) further comprise a mid release lever shaft (166) and having the mid release lever (160) further comprise a pivot hole (163) and one or more hollow cylinders (164). The one or more hollow cylinders (164) are connected to the mid release lever (160) so that the pivot hole (163) of the mid release lever (160) and the one or more hollow cylinders (164) are concentric. The axis of the hollow cylinders (164) is perpendicular to the longitudinal axis of the mid release lever (160) and parallel to the transverse axis of the mid release lever (160). The mid release lever shaft (166) comprises a left end (168) and a right end (169). Either the left end (168), the right end (169) or both the left end (168) and the right end (169) are connected to the frame (100). For example, the left end (168) of the mid release lever shaft (166) is connected to the left side member (180), and the right end (169) of the mid release lever shaft (166) is connected to the right side member (190). The mid release lever shaft (166) projects through the pivot hole (163) and the one or more hollow cylinders (164). FIG. 8 is a perspective view of the mid release lever (160) showing this embodiment.

Figure 14:
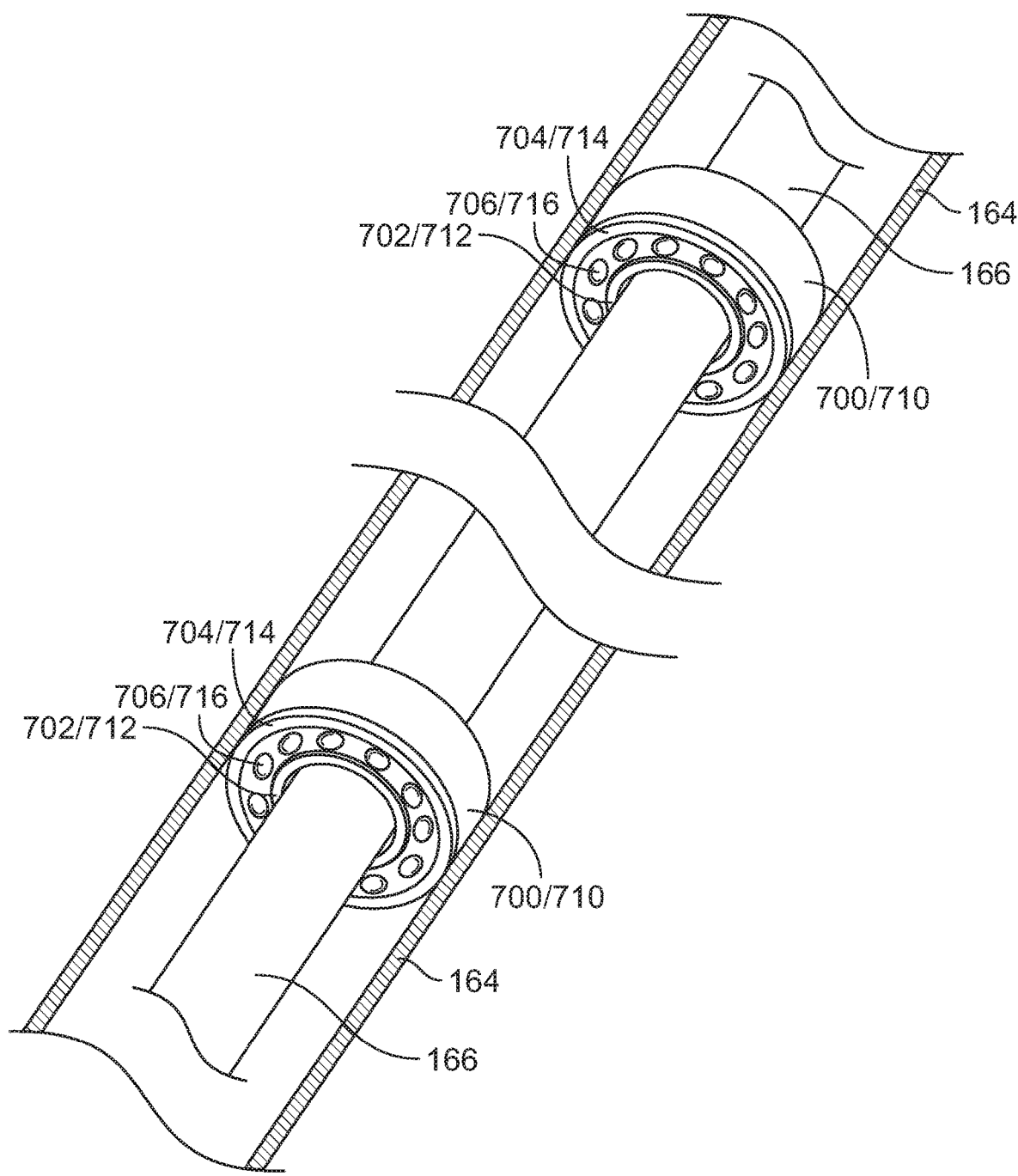
FIG. 14 is a perspective sectional view of two hollow cylinders (164), showing two hollow cylinder rolling-element bearings (710) connecting the hollow cylinders (164) to the mid release lever shaft (166).

The pivoted connection between the mid release lever (160) and the frame (100) may comprise having the frame (100) further comprise a mid release lever shaft (166) and having the mid release lever (160) further comprise a pivot hole (163) and one or more hollow cylinders (164), and one or more hollow cylinder rolling-element bearings (710). The one or more hollow cylinders (164) are connected to the mid release lever (160) so that the pivot hole (163) of the mid release lever (160) and the one or more hollow cylinders (164) are concentric. The axis of the hollow cylinders (164) is perpendicular to the longitudinal axis of the mid release lever (160) and parallel to the transverse axis of the mid release lever (160). The mid release lever shaft (166) comprises a left end (168) and a right end (169). Either the left end (168), the right end (169) or both the left end (168) and the right end (169) are connected to the frame (100). For example, the left end (168) of the mid release lever shaft (166) is connected to the left side member (180), and the right end (169) of the mid release lever shaft (166) is connected to the right side member (190). The mid release lever shaft (166) projects through the pivot hole (163) and the one or more hollow cylinders (164). The inner race (712) of each of the hollow cylinder rolling-element bearings (710) is connected to the mid release lever shaft (166). The outer race (714) of each of the hollow cylinder rolling-element bearings (710) is connected to one of the hollow cylinders (164). FIG. 14 is a perspective sectional view of two hollow cylinders (164), showing two hollow cylinder rolling-element bearings (710) connecting the hollow cylinders (164) to the mid release lever shaft (166).

Back Assembly (170)

The back assembly (170) comprises one or more back cross members (172), two hind legs (175)—a left leg (176) and a right leg (178)—a first means to rotate the back cross member (602), and a second means to rotate the back cross member (604).

The back cross member (172) comprises a left end (173) and a right end (174). The left leg (176) is connected to the left end (173) of the back cross member (172). The right leg (178) is connected to the right end (174) of the back cross member (172). FIG. 11 shows the back assembly (170) comprising a back cross member (172) and two hind legs (175)—a left leg (176) and a right leg (178).

The first means to rotate the back cross member (602) connects the back end (184) of the left side member (180) to the left end (173) of the back cross member (172). The second means to rotate the back cross member (604) connects the back end (194) of the right side member (190) to the right end (174) of the back cross member (172).

Alternatively, the back assembly (170) is comprised a back cross member (172), and two hind legs (175)—a left leg (176) and a right leg (178). The back end (184) of the left side member (180) is pivotally connected to the left end (173) of the back cross member (172). The back end (194) of the right side member (190) is pivotally connected to the right end (174) of the back cross member (172). FIG. 11 is a back perspective view of the cattle roping training dummy (90) in its folded configuration, where the mid supporting shaft (360) fits within the recess (418). The back end (184) of the left side member (180) is pivotally connected to the left end (173) of the back cross member (172). The back end (194) of the right side member (190) is pivotally connected to the right end (174) of the back cross member (172).

The two hind legs (175) are connected to the back cross member (172) so that they rotate together.

Figure 5:
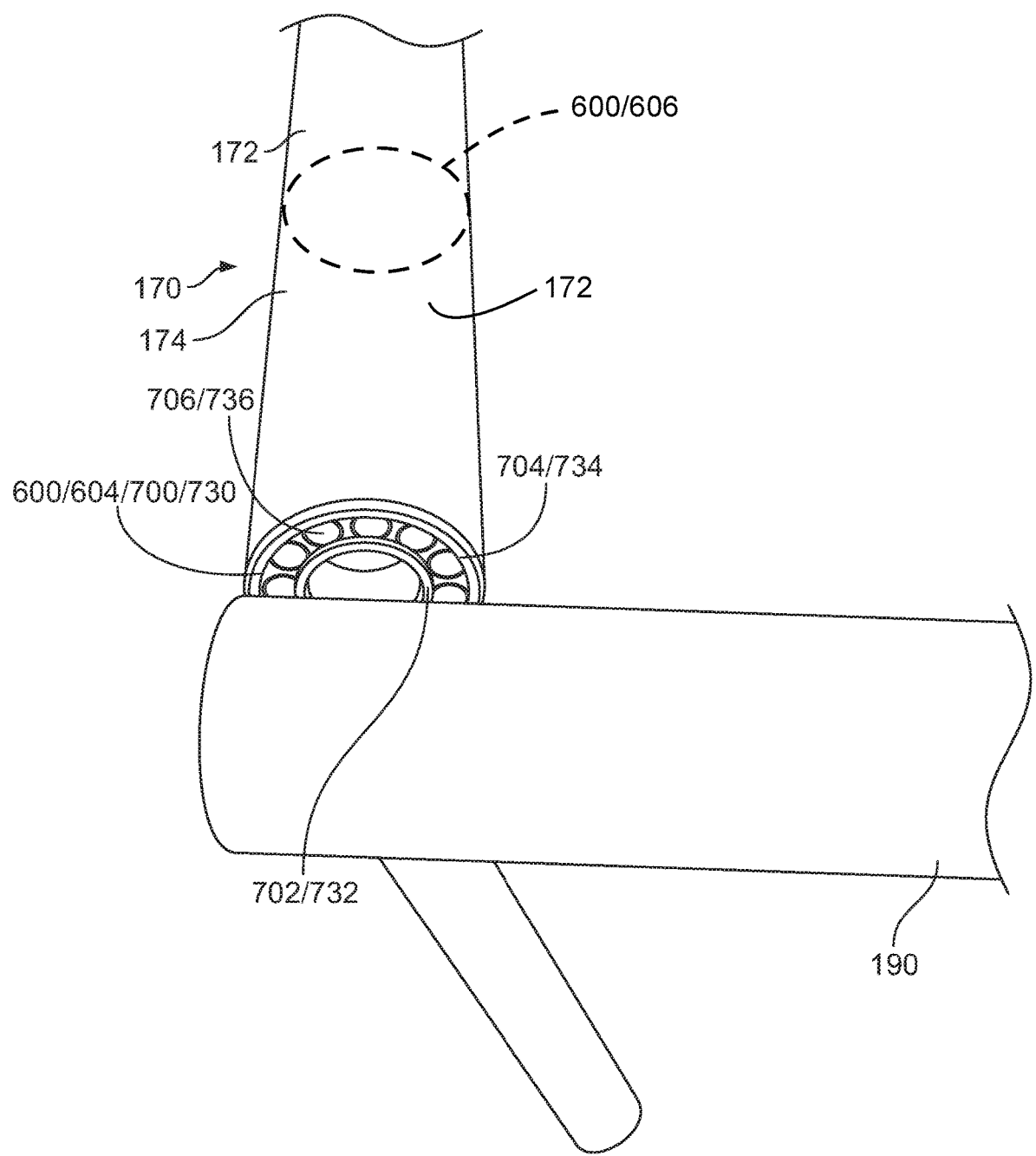
FIG. 5 is a perspective view of the means to rotate the back cross member (600), where the means is a back assembly rolling-element bearing (730).

Alternatively, the two hind legs (175) are connected so that they rotate independent of each other. This can be achieved by having two back cross members (172), a first back cross member and a second back cross member, pivotally connected to each other or connected by a third means to rotate the back cross member (606). The left leg (176) is connected to the first back cross members (172) and the right leg (178) is connected to the second back cross members (172). The first back cross member (172) is pivotally connected or connected by the first means to rotate the back cross member (602) to the left side member (180), specifically the back end (184) of the left side member (180). The second back cross member (172) is pivotally connected or connected by the second means to rotate the back cross member (604) to the right side member (190), specifically the back end (194) of the right side member (190). FIG. 5 is a perspective view of the back assembly (170), showing two back cross members (172) pivotally connected by the third means to rotate the back cross member (606).

At rest, the hind legs (175) of the back cross member (172) are oriented down, that is perpendicular to the frame axis. FIG. 1 shows the two hind legs (175) oriented down, that is perpendicular to the frame axis.

Means to Rotate the Back Cross Member (600)

The means to rotate the back cross member (600) allows the back cross member (172) to rotate relative to the left side member (180) and the right side member (190). This rotation allows the hind legs (175) to swing up and down, simulating the movement of cattle legs while the cattle buckles. At least two instances of the means to rotate the back cross member (600) are utilized—a first means to rotate the back cross member (602), and a second means to rotate the back cross member (604).

Figure 6:
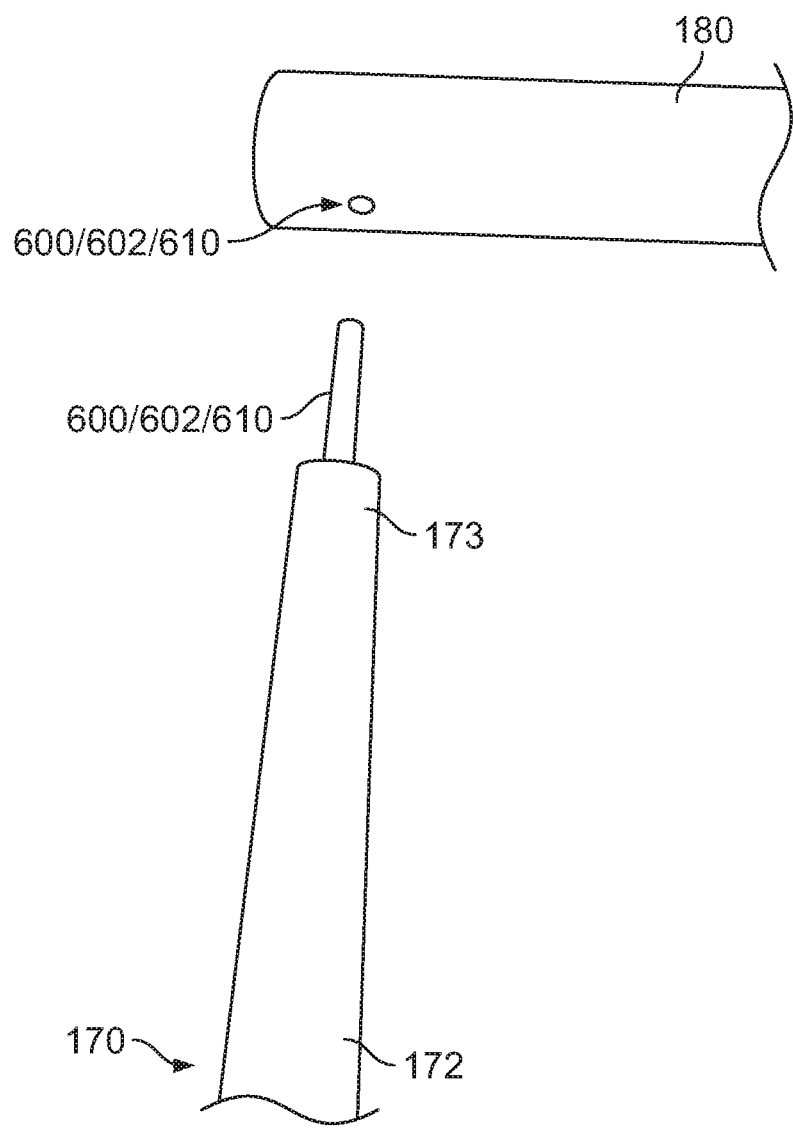
FIG. 6 is a perspective view of the means to rotate the back cross member (600), where the means is a pivoted connection (610).

The means to rotate the back cross member (600) can be a pivoted connection (610). FIG. 6 is a perspective view of the means to rotate the back cross member (600), where the means is a pivoted connection (610).

The means to rotate the back cross member (600) can be a back assembly rolling-element bearing (730). The inner race (732) of the back assembly rolling-element bearing (730) attaches to a first attachment point, the outer race (734) of the back assembly rolling-element bearing (730) attaches to a second attachment point, and the rolling elements (736) lie between the inner race (732) and the outer race (734) of the back assembly rolling-element bearing (730). In a first example, the first attachment point maybe the left side member (180) and the right side member (190), and the second attachment point maybe the back cross member (172). In a second example, the first attachment point maybe the back cross member (172), and the second attachment point maybe the left side member (180) and the right side member (190). FIG. 5 is a perspective view of the means to rotate the back cross member (600), where the means is a back assembly rolling-element bearing (730).

Supporting Structure (300)

Figure 7:
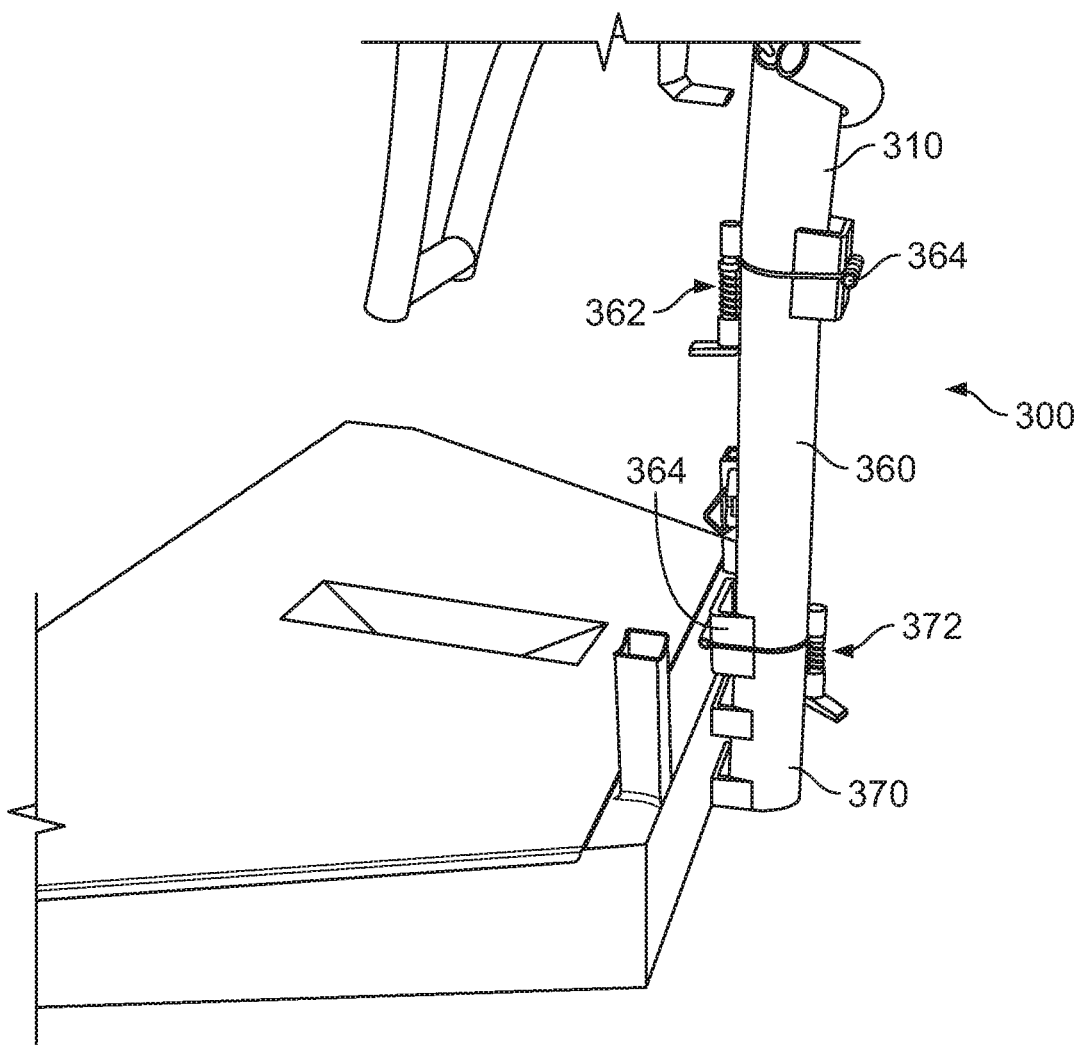
FIG. 7 is a side view of the supporting structure (300) and the base (400).

The supporting structure (300) comprises a top supporting shaft (310), a mid supporting shaft (360), a bottom supporting shaft (370), and a platform (313). FIG. 7 is a side view of the supporting structure (300) and the base (400).

The top supporting shaft (310) is pivotally connected to the mid supporting shaft (360) with a pivoted connection (364). The mid supporting shaft (360) is pivotally connected to the bottom supporting shaft (370) with a pivoted connection (374). The bottom supporting shaft (370) is connected to the base (400).

The supporting structure (300) may further comprise a first lock (372) and a second lock (362).

The first lock (372) secures the bottom supporting shaft (370) to the mid supporting shaft (360) when the mid supporting shaft (360) has been pivoted over the bottom supporting shaft (370). When secured, the first lock (372) prevents movement of the bottom supporting shaft (370) and the mid supporting shaft (360) relative to each other.

The second lock (362) secures the mid supporting shaft (360) to the top supporting shaft (310) when the top supporting shaft (310) has been pivoted over the mid supporting shaft (360). When secured, the second lock (362) prevents movement of the mid supporting shaft (360) and the top supporting shaft (azo) relative to each other.

Platform (313)

The platform (313) is connected to the top supporting shaft (310). The platform (313) comprises a catch (314). The platform (313) may be further comprise a side release lever (320). FIG. TO is a perspective view of the mid release lever (160) and the platform (313) as the mid release lever (160) has been released from the catch (314).

The side release lever (320) comprises an effort end (326) and a load end (328). The side release lever (320) is pivotally connected to the platform (313). The load end (328) of the side release lever (320) is located so that it strikes the load end (162) of the mid release lever (160). FIG. 8 is a perspective view of the mid release lever (160) and the platform (313) with the load end (162) of the mid release lever (160) fixed in position by the catch (314). The cattle roping training dummy (90) is in its spring-loaded position and the spring (200) is in a full loaded state. The side release lever (320) is pivotally connected to the platform (313).

The catch (314) fixes in place the load end (162) of the mid release lever (160), preventing rotational motion when the frame (100) is in the spring-loaded position. An example of a catch (314) that prevents the frame (100) from rotating is two parallel flanges, a left flange (316) and a right flange (318). In the spring-loaded position, the load end (162) of the mid release lever (160) would be positioned between the left flange (316) and the right flange (318) of the catch (314). FIG. 10 shows a catch (314) with two parallel flanges, a left flange (316) and a right flange (318).

Spring (200)

The spring (200) provides the mechanical energy to rotate the frame (100) from the spring-loaded position to the released position. The spring (200) comprises a first end (202) and a second end (204). The spring (200) can either be a tension or a compression spring. The first end (202) of the spring (200) is connected to the frame (100). The second end (204) of the spring (200) is connected to the supporting structure (300). When the frame (100) is in its released position, the spring (200) is without a load, the unloaded state. As of the frame (100) is rotated and the mid-cross member (152) is rotated around its pivoted connection with the top supporting shaft (310), a load is applied to the spring (200). In a tension spring, the spring (200) stretches as the load is applied to it. In a compression spring, the spring (200) gets shorter or compresses as the load is applied to it. The spring (200), the frame (100) and the support structure (300) is configured so that the frame (100) rotates clockwise from its released position to its spring-loaded position and counter-clockwise when the frame (100) rotates from its spring-loaded position to its released position. As a separate embodiment, the spring (200), the frame (100) and the support structure (300) are configured so that the frame (100) rotates counter-clockwise for the frame (100) to rotate from its released position to its spring-loaded position and clockwise when the frame (100) rotates from its spring-loaded position to its released position.

The frame (100) rotates approximately ninety degrees (90°) ("angular rotation") when moving from the released position to the spring-loaded position. The angular rotation may be changed by changing the angle between the the mid-cross member (152) and the left side member (180) and the right side member (190). When the angular rotation is ninety degrees (90°), the mid-cross member (152) is approximately perpendicular to the left side member (180) and the right side member (190). The angular rotation may be changed by changing the position of the platform (313) and the catch (314) so that the frame (100) rotates more or less until the load end (162) of the mid release lever (160) is restrained within the catch (314).

When the frame (100) reaches its spring-loaded position, the load end (162) of the mid release lever (160) is restrained within the catch (314) of the supporting structure (300). The spring (200) is at its full loaded state, storing mechanical energy. FIG. 8 is a perspective view of the mid release lever (160) and the platform (313) with the mid release lever (160) fixed in place by the catch (314). The cattle roping training dummy (90) is in its spring-loaded position and the spring (200) is in a full loaded state.

When the load end (162) of the mid release lever (160) moves up and is released from the catch (314), the spring (200) releases its mechanical energy from its loaded state, transitioning to its unloaded state. The spring (200) rotates the frame (100), and the mid-cross member (152) is rotated around its pivoted connection with the top supporting shaft (310).

As the frame (100) reaches the released position, the rotation limiting plate (158) of the frame (100) strikes the platform (313), preventing the frame (100) from over rotating past the released position. When the rotation limiting plate (158) strikes the platform (313), the frame (100) bounces back and rotates back towards the spring-loaded position, once again loading the spring (200). Because of the friction in the pivoted connection between the mid-cross member (152) of the frame (100) and the top supporting shaft (310), the frame (100) does not rotate back fully to the spring-loaded position. Rather, the frame (100) stops short of the spring-loaded position and then rotates back due to the load in the spring (200). The frame (100) oscillates back and forth a number of times until the frame (100) ultimately stops at the released position, the spring (200) having released all the stored mechanical energy. FIG. 1 is a perspective view of the cattle roping training dummy (90) in its released position.

As the frame (100) oscillates back and forth, the right leg (178) and the left leg (176) of the back assembly (170) swing up and down due to the angular momentum and ability of the back cross member (172) to rotate with respect to the frame (100). This back and forth oscillation of the frame (100) combined with up and down motion of the right leg (178) and the left leg (176) creates movement that is challenging for a "heeler" to rope the right leg (178) and the left leg (176). This movement better simulates the real leg motions of bucking steer and calves.

Base (400)

The base (400) provides upright support for the cattle roping training dummy (90) and the ability to fit a folded supporting structure (300). The base (400) may also provide storage space for loose objects.

Figure 12:
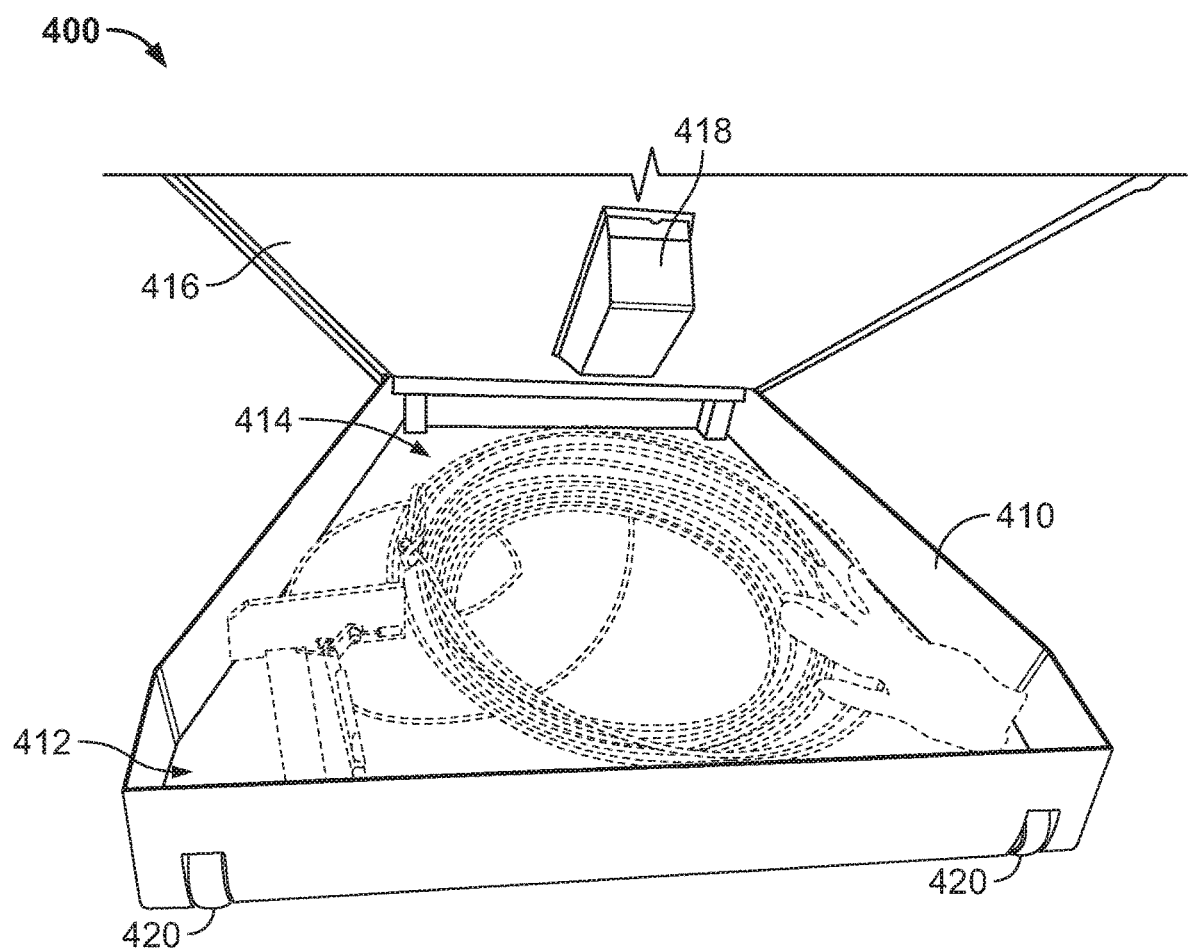
FIG. 12 is a front perspective view of the base (400), which comprises a housing (410) and a plurality of wheels (420). The housing (410) comprises a front end (412), a back end (414), and a top lid (416). The wheels (420) are pivotally connected the housing (410). A recess (418) is defined within the top lid (416).

The base (400) may comprise a housing (410), and a plurality of wheels (420). The housing (410) provides storage space for loose objects. The housing (410) comprises a front end (412), and a back end (414). The housing (410) may further comprise a top lid (416). The top lid (416) provides access to the inside of the housing (410). The wheels (420) are pivotally connected the housing (410). FIG. 12 is a front perspective view of the base (400), which comprises a housing (410) and a plurality of wheels (420). The housing (410) comprises a front end (422), a back end (414), and a top lid (416). The wheels (420) are pivotally connected the housing (410). A recess (418) is defined within the top lid (416).

The top lid (416) of the housing (410) may be removable from the housing (410) or pivotally connected to the housing (410). A recess (418) is defined within the housing (410); when the top lid (416) is present, the recess (418) is defined within the top lid (416). The recess (418) is shaped and sized to receive the mid supporting shaft (360) when the supporting structure (300) is in its folded configuration.

To place the cattle roping training dummy (90) to its folded configuration, the second lock (362) is unlocked and the top supporting shaft (310) is pivoted back relative to the mid supporting shaft (360). The first lock (372) is unlocked and the mid supporting shaft (360) is pivoted forward relative to the bottom supporting shaft (370). When the mid supporting shaft (360) is pivoted forward relative to the bottom supporting shaft (370), the mid supporting shaft (360) fits within the recess (418), preventing lateral movement by the mid supporting shaft (360) and the top supporting shaft (310). The supporting structure (300) is folded, and the frame (100) stands substantially parallel to the base (400) and the ground. FIG. 11 is a back perspective view of the cattle roping training dummy (90) in its folded configuration, where the mid supporting shaft (360) fits within the recess (418).

To place the cattle roping training dummy (90) to its deployed configuration, the top supporting shaft (310) is pivoted forward relative to the mid supporting shaft (360) and the second lock (362) is locked. The mid supporting shaft (360) is pivoted backwards relative to the bottom supporting shaft (370) and the first lock (372) is locked. The supporting structure (300) stands upright at this point, and the frame (100) stands parallel to the base (400) and the ground.

The base (400) may further comprise a left mount (430), a right mount (432), a first means to lock frame to base (442) and a second means to lock frame to base (444). The left mount (430) and the right mount (432) are connected to the housing (410) and serve to stabilize the frame (100) when the supporting structure (300) is in its folded configuration. The left mount (430) is connected to the first means to lock frame to base (442) and the right mount (432) is connected to the second means to lock frame to base 444) FIG. 3 shows a left mount (430) and a right mount (432) connected to the housing (410). A first means to lock frame to base (442) is connected to the left mount (430) and a second means to lock frame to base (444) is connected to the right mount (432).

When the top lid (416) is removable from the housing (410) or pivotally connected to the housing (410), it allows for the placement and storage of objects within the housing (410) such as ropes, gloves, and roper's sports powder. FIG. 12 shows the arrangement of objects such as ropes and gloves within the housing (410).

Means to Lock Frame to Base (440)

The means to lock frame to base (440) allows the frame (100) to be secured to the base (400) when the supporting structure (300) is in its folded configuration and being transported from one place to another place. This allows the cattle roping training dummy (90) to be portable, preventing the supporting structure (300) from being released from the recess (418). At least two means to lock frame to base (440) may be used, a first means to lock frame to base (442) and a second means to lock frame to base (444).

The means to lock frame to base (440) can be a lock, a latch, a clamp, or equivalent.

Means to Actuate Side Release Lever (500)

The means to actuate side release lever (500) allows the cowboy to release the frame (100) from its spring-loaded position to its released position without having to actuate the front release lever (120). This feature is useful for a "heeler" to practice roping the cattle roping training dummy's (90) hind legs (175) alone, without needing the "header" to rope the head of the cattle roping training dummy (90). The means to actuate side release lever (500) allows the cowboy to release the frame (100) from its spring-loaded position from afar. The means to actuate side release lever (500) is connected to the effort end (326) of the side release lever (320). When the "heeler" actuates the means to actuate side release lever (500), he moves the means to actuate side release lever (500) so that the effort end (326) of the side release lever (320) is moved down.

The means to actuate side release lever (500) may comprise a first end (502) and a second end (504). The first end (502) of the means to actuate side release lever (500) is connected to the effort end (326) of the side release lever (320). The cowboy actuates the second end (504) of the means to actuate side release lever (500) so that the first end (502) of the means to actuate side release lever (500) actuate the side release lever (320).

The means to actuate side release lever (500) can be as simple as a rope, string, cable or the like (530), having a first end (532) and a second end (534). In this instance, the cowboy moves the second end (534) of the rope, string, cable or the like (530) to actuate the side release lever (320). Although a simple solution, this configuration requires an additional person to actuate the means to actuate side release lever (500) since the "heeler" needs to be prepared to lasso the hind legs (175) of the cattle roping training dummy (90).

The means to actuate side release lever (500) may comprise a pedal (510) and a mechanical cable assembly (520). The mechanical cable assembly (520) comprises a first end (522) and a second end (524). The first end (522) is connected to the effort end (326) of the side release lever (320). The second end (524) is connected to the pedal (510). This configuration allows the use of the cattle roping training dummy (90) by a single cowboy. The cowboy actuates the pedal (510) using his/her foot while maintaining control of the lasso. This actuation can be pressing, pulling, striking, etc. When the cowboy actuates the pedal (510), the pedal (510) translates the mechanical cable assembly (520), causing the first end (522) of the mechanical cable assembly (520) to actuate the side release lever (320), rotating down the effort end (326) of the side release lever (320). This releases the frame (100) from its spring-loaded position.

Figure 13:
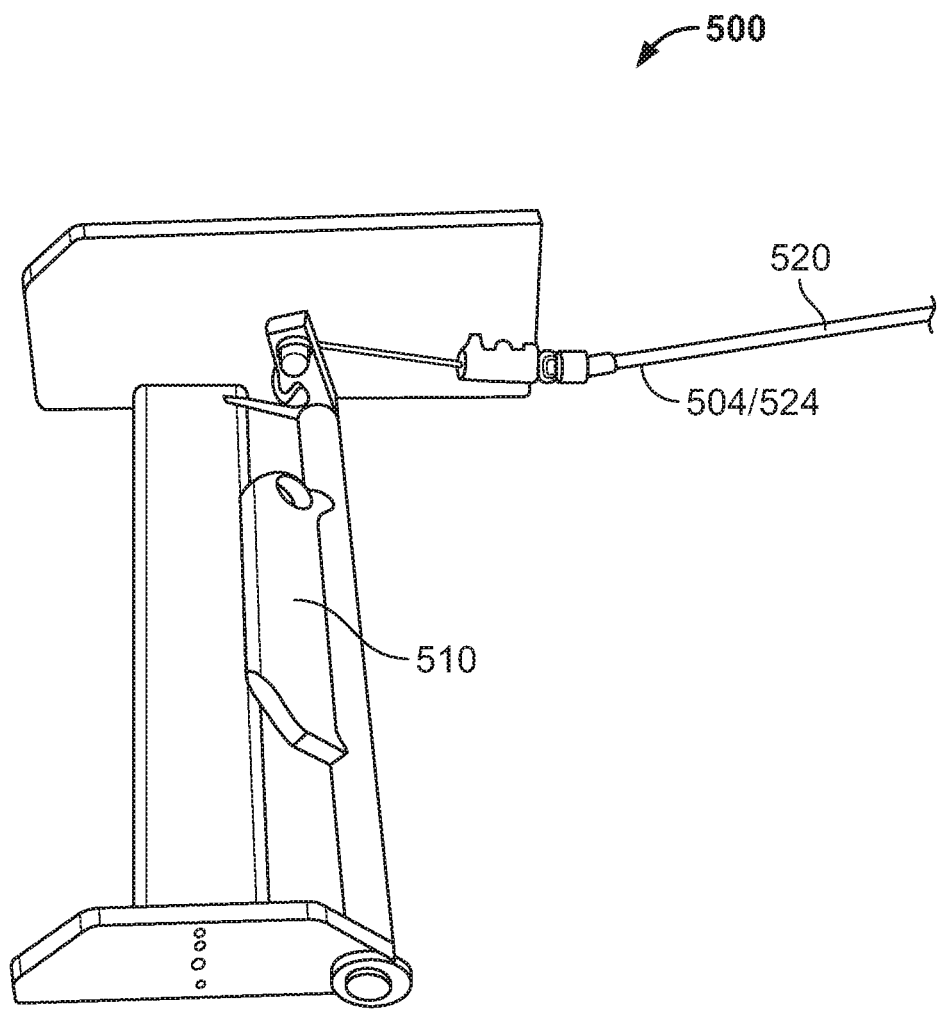
FIG. 13 is a perspective view of the means to actuate side release lever (500), which comprises a pedal (510) and a mechanical cable assembly (520).

FIG. 4 is a perspective view of the cattle roping training dummy (90) in its released position with a means to actuate side release lever (500) connected. The means to actuate side release lever (500) comprises a mechanical cable assembly (520) and a pedal (510). FIG. 13 is a perspective view of the means to actuate side release lever (500), which comprises a pedal (510) and a mechanical cable assembly (520).

The means to actuate side release lever (500) is connected to the effort end (326) of the side release lever (320). The means to actuate side release lever (500) actuates the effort end (326) of the side release lever (320), moving down the effort end (326) of the side release lever (320). When the effort end (326) of the side release lever (320) moves down, the side release lever (320) pivots and strikes the load end (328) of the side release lever (320), causing the load end (228) of the side release lever (320) to move up.

When the load end (328) of the side release lever (320) moves up, it actuates the mid release lever (160). When the mid release lever (160) is actuated, the load end (162) of the mid release lever (160) is moved up. When the load end (162) of the mid release lever (160) moves up, the load end (162) is released from the catch (314) connected to the platform (313) of the supporting structure (300).

When the load end (162) of the mid release lever (160) is released from the catch (314), the spring (200) releases its stored mechanical energy and rotates the frame (100) around its pivoted connection to the top supporting shaft (310). The spring (200) rotates the frame (100) from the spring-loaded position to the released position.

Deploying and Using the Cattle Roping Training Dummy (90)

To initiate the roping practice, the cowboy changes over the cattle roping training dummy (90) from its folded configuration to its deployed configuration. If present, the cowboy unlocks the means to lock frame to base (440). The top supporting shaft (310) is then pivoted forward relative to the mid supporting shaft (360) and the second lock (362) is locked. The mid supporting shaft (360) is pivoted backwards relative to the bottom supporting shaft (370) and the first lock (372) is locked. The supporting structure (300) stands upright at this point, and the frame (100) stands substantially parallel to the base (400) and the ground.

To practice, the cowboy rotates the frame (100) from the released position to the spring-loaded position. The rotation of the frame (100) allows a spring (200) to be loaded, storing mechanical energy.

In a two person "header" and "heeler" practice, when the "header" places a lasso around the front assembly (110) and pulls the lasso tight, the lasso actuates the effort end (122) of the front release lever (120), moving the effort end (122) of the front release lever (120) towards the vertical member (112 or 114) to which the front release lever (120) is pivotally connected. The front release lever (120) pivots around the pivoted connection and the load end (124) of the front release lever (120) moves down. When the load end (124) of the front release lever (120) moves down, it strikes the effort end (161) of the mid release lever (160). This causes the effort end (161) of the mid release lever (160) to move down, and the mid release lever (160) to pivot around its pivoted connection. This, in turn, causes the load end (162) of the mid release lever (160) to move up.

When the load end (162) of the mid release lever (160) moves up and the load end (162) is released from the catch (314), the spring (200) releases its mechanical energy from its loaded state, transitioning to its unloaded state. The spring (200) rotates the frame (100), pivoting around its pivoted connection with the top supporting shaft (310).

As the frame (100) reaches the released position, the rotation limiting plate (158) of the frame (100) strikes the platform (313), preventing the frame (100) from over rotating past the released position. When the rotation limiting plate (158) strikes the platform (313), the frame (100) bounces back and rotates back towards the spring-loaded position, once again loading the spring (200). Because of the friction in the pivoted connection between the frame (100) and the top supporting shaft (310), the frame (100) does not rotate back fully to the spring-loaded position. Rather, the frame (100) stops short of the spring-loaded position and then rotates back due to the load in the spring (200). The frame (100) oscillates back and forth a number of times until the frame (100) ultimately stops at the released position, the spring (200) having released all the stored mechanical energy.

When the frame (100) rotates back and forth, the "heeler" has the opportunity to rope the hind legs (175) of the cattle roping training dummy (90). The hind legs (175) have the ability to swing up and down, simulating the hind leg motion of bucking cattle.

In a one person "heeler" practice, the "heeler" actuates the means to actuate side release lever (500), actuating the means to actuate side release lever (500) so that the effort end (326) of the side release lever (320) is moved down. When the effort end (326) of the side release lever (320) moves down, the side release lever (320) pivots causing the load end (328) of the side release lever (320) to move up.

When the load end (328) of the side release lever (320) moves up, it actuates the mid release lever (160). When the mid release lever (160) is actuated, the load end (162) of the mid release lever (160) is moved up. When the load end (162) of the mid release lever (160) moves up, the load end (162) is released from the catch (314) connected to the platform (313) of the supporting structure (300).

When the load end (162) of the mid release lever (160) is released from the catch (314), the spring (200) releases its stored mechanical energy and the mid-cross member (152) of the frame (100) rotates around the pivoted connection to the top supporting shaft (310) of the supporting structure (300). The spring (200) rotates the frame (100) from the spring-loaded position to the released position as described above. When the frame (100) rotates back and forth, the "heeler" has the opportunity to rope the hind legs (175) of the cattle roping training dummy (90). The hind legs (175) have the ability to swing up and down, simulating the hind leg motion of bucking cattle.

Once the roping practice is concluded, the cowboy changes over the cattle roping training dummy (90) from its deployed configuration to its folded configuration. The second lock (362) is unlocked and the top supporting shaft (310) is pivoted back relative to the mid supporting shaft (360). The first lock (372) is unlocked and the mid supporting shaft (360) is pivoted forward relative to the bottom supporting shaft (370). When the mid supporting shaft (360) is pivoted forward relative to the bottom supporting shaft (370), the mid supporting shaft (360) fits within the recess (418), preventing lateral movement by the mid supporting shaft (360) and the top supporting shaft (310). The supporting structure (300) is folded, and the frame (100) stands substantially parallel to the base (400) and the ground. If present, the cowboy locks the means to lock frame to base (440). In its folder configuration, the cattle roping training dummy (90) can be moved around easily.

Clarifying Comments

While the foregoing written description of the invention enables a person having ordinary skill in the art to make and use what is considered presently to be the best mode thereof, those of ordinary skill in the art will understand and appreciate the existence of variations, combinations, and equivalents of the specific embodiment, process, and examples herein. The invention should therefore not be limited by the above described embodiment, process, and examples, but by all embodiments and processes within the scope and spirit of the invention.

SEQUENCE LISTING

Not Applicable

I claim:
1. A cattle roping training dummy comprising:
(a) a frame; the frame comprising:
  (i) a front release lever; the front release lever comprising: an effort end and a load end;
  (ii) a left side member; the left side member comprising:
    (1) a front end; and
    (2) a back end;
  (iii) a right side member; the right side member comprising:
    (1) a front end; and
    (2) a back end;
  (iv) a front assembly; the front assembly comprising:
    (1) a left vertical member;
    (2) a right vertical member;
    (3) a bottom cross member;
    (4) a top cross member; where the top cross member is connected to the left vertical member and the right vertical member and extends past the left vertical member and the right vertical member,
    (5) a bottom cross member; where the bottom cross member is connected to the left vertical member and the right vertical member,
    (6) where the front release lever is pivotally connected to either the left vertical member or the right vertical member,
    (7) where the front end of the left side member is connected to the left vertical member of the front assembly,
    (8) where the front end of the right side member is connected to the right vertical member of the front assembly,
  (v) a mid assembly, the mid assembly comprising:
    (1) a mid-cross member; the mid-cross member comprising: a left end and a right end;
    (2) a rotation limiting plate;
    (3) where the rotation limiting plate is connected to the mid-cross member,
    (4) where the left end of the mid-cross member is connected to the left side member, and
    (5) where the right end of the mid-cross member is connected to the right side member,
  (vi) a mid release lever; the mid release lever comprising: an effort end and a load end;
    (1) where the mid release lever is pivotally connected to the left side member and the right side member,
  (vii) a back assembly; the back assembly comprising:
    (1) a back cross member; the back cross member comprising:
      (a) a left end;
      (b) a right end;
    (2) a right leg;
    (3) a left leg;
    (4) a first means to rotate the back cross member;
    (5) a second means to rotate the back cross member;
    (6) where the right leg is connected to the right end of the back cross member,
    (7) where the left leg is connected to the left end of the back cross member,
    (8) where the first means to rotate the back cross member connects the back end of the left side member to the left end of the back cross member,
    (9) where the second means to rotate the back cross member connects the back end of the right side member to the right end of the back cross member,
(b) a supporting structure; the supporting structure comprising:
  (i) a top supporting shaft;
  (ii) a mid supporting shaft;
  (iii) a bottom supporting shaft;

(iv) a platform; the platform comprising:
  (1) a catch;
  (2) a side release lever; the side release lever comprising an effort end and a load end;
  (3) where the platform is connected to the top supporting shaft,
  (4) where the side release lever is pivotally connected to the platform,
  (5) where the catch is connected to the platform,
  (6) where the catch may fix in place the load end of the mid release lever, to prevent rotational motion of mid-cross member over the top supporting shaft,
(v) a first lock; where the first lock secures the bottom supporting shaft to the mid supporting shaft,
(vi) a second lock; where the second lock secures the mid supporting shaft to the top supporting shaft,
(vii) where the mid supporting shaft is pivotally connected to the top supporting shaft,
(viii) where the bottom supporting shaft is pivotally connected to the mid supporting shaft,
(ix) where the mid-cross member is pivotally connected to the top supporting shaft,
(c) a base; where the bottom supporting shaft is connected to the base,
(d) a spring, the spring comprising:
  (i) a first end; and
  (ii) a second end;
  (iii) where the first end of the spring is connected to the supporting structure,
  (iv) where the second end of the spring is connected to the frame,
(e) where the effort end of the front release lever is offset from the front assembly,
(f) where the load end of the front release lever is located to strike the effort end of the mid release lever,
(g) where the load end of the side release lever is located to strike the load end of the mid release lever,
(h) where the load end of the front release lever strikes the effort end of the mid release lever when the effort end of the front release lever is actuated,
(i) where the spring pivots the mid-cross member over the top supporting shaft when the mid release lever is struck by the front release lever or the side release lever, unfixing the load end of the mid release lever from the catch to allow the mid-cross member to rotate.

2. The cattle roping training dummy described in claim 1, the base further comprising:
(a) a plurality of wheels; and
(b) a housing, the housing comprising:
  (i) a recess;
  (ii) a top lid;
  (iii) where the wheels are pivotally connected to the housing to provide mobility to the cattle roping training dummy,
  (iv) where the top lid is pivotally connected to the housing.

3. The cattle roping training dummy described in claim 2, the base further comprising:
(a) a left mount;
(b) a right mount;
(c) a first means to lock frame to base;
(d) a second means to lock frame to base;
(e) where the left mount and the right mount are connected to the base,
(f) where the first means to lock frame to base is connected to the left mount,
(g) where the second means to lock frame to base is connected to the right mount,
(h) where the frame can be secured to the base by the first means to lock frame and the second means to lock frame.

4. The cattle roping training dummy described in claim 1 further comprising:
(a) a means to actuate side release lever;
(b) where the means to actuate side release lever is connected to the effort end of the side release lever.

5. The cattle roping training dummy described in claim 4,
(a) wherein the means to actuate side release lever comprises:
  (i) a mechanical cable assembly; the mechanical cable assembly comprising:
    (1) a first end; and
    (2) a second end;
  (ii) a pedal;
  (iii) where the pedal is connected to the second end of the mechanical cable assembly,
  (iv) where the first end of the mechanical cable is connected to the effort end of the side release lever.

6. The cattle roping training dummy described in claim 2 further comprising:
(a) a means to actuate side release lever;
(b) where the means to actuate side release lever is connected to the effort end of the side release lever.

7. The cattle roping training dummy described in claim 6,
(a) wherein the means to actuate side release lever comprises:
  (i) a mechanical cable assembly; the mechanical cable assembly comprising:
    (1) a first end; and
    (2) a second end;
  (ii) a pedal;
  (iii) where the pedal is connected to the second end of the mechanical cable assembly,
  (iv) where the first end of the mechanical cable is connected to the effort end of the side release lever.

8. The cattle roping training dummy described in claim 6, the base further comprising:
(a) a left mount;
(b) a right mount;
(c) a first means to lock frame to base;
(d) a second means to lock frame to base;
(e) where the left mount and the right mount are connected to the base,
(f) where the first means to lock frame to base is connected to the left mount,
(g) where the second means to lock frame to base is connected to the right mount,
(h) where the frame can be secured to the base by the first means to lock frame and the second means to lock frame.

9. An improved cattle roping training dummy comprising:
(a) a frame; the frame comprising:
  (i) a front release lever; the front release lever comprising: an effort end and a load end;
  (ii) a left side member; the left side member comprising:
    (1) a front end; and
    (2) a back end;
  (iii) a right side member; the right side member comprising:
    (1) a front end; and
    (2) a back end;

(iv) a front assembly; the front assembly comprising:
  (1) a left vertical member;
  (2) a right vertical member;
  (3) a top cross member; where the top cross member is connected to the left vertical member and the right vertical member and extends past the left vertical member and the right vertical member,
  (4) where the front release lever is pivotally connected to either the left vertical member or the right vertical member,
  (5) where the front end of the left side member is connected to the left vertical member of the front assembly,
  (6) where the front end of the right side member is connected to the right vertical member of the front assembly,
(v) a mid assembly, the mid assembly comprising:
  (1) a mid-cross member; the mid-cross member comprising: a left end and a right end;
  (2) a rotation limiting plate;
  (3) where the rotation limiting plate is connected to the mid-cross member,
  (4) where the left end of the mid-cross member is connected to the left side member, and
  (5) where the right end of the mid-cross member is connected to the right side member,
(vi) a mid release lever; the mid release lever comprising: an effort end, a load end, and a pivot hole;
(vii) a mid release lever shaft; the mid release lever shaft comprising: a left end and a right end;
  (1) where the left end of the mid release lever shaft is connected to the left side member,
  (2) where the right end of the mid release lever shaft is connected to the right side member,
  (3) where the mid release lever shaft projects through the pivot hole of the mid release lever, creating a pivoted connection,
(viii) a back assembly; the back assembly comprising:
  (1) a back cross member; the back cross member comprising:
    (a) a left end;
    (b) a right end;
  (2) a right leg;
  (3) a left leg;
  (4) a first means to rotate the back cross member;
  (5) a second means to rotate the back cross member;
  (6) where the right leg is connected to the right end of the back cross member,
  (7) where the left leg is connected to the left end of the back cross member,
  (8) where the first means to rotate the back cross member connects the back end of the left side member to the left end of the back cross member,
  (9) where the second means to rotate the back cross member connects the back end of the right side member to the right end of the back cross member,
(b) a supporting structure; the supporting structure comprising:
(i) a top supporting shaft;
(ii) a mid supporting shaft;
(iii) a bottom supporting shaft;
(iv) a platform; the platform comprising:
  (1) a catch;
  (2) a side release lever; the side release lever comprising an effort end and a load end;
  (3) where the platform is connected to the top supporting shaft,
  (4) where the side release lever is pivotally connected to the platform,
  (5) where the catch is connected to the platform,
  (6) where the catch may fix in place the load end of the mid release lever, to prevent rotational motion of mid-cross member over the top supporting shaft,
(v) a first lock; where the first lock secures the bottom supporting shaft to the mid supporting shaft,
(vi) a second lock; where the second lock secures the mid supporting shaft to the top supporting shaft,
(vii) where the mid supporting shaft is pivotally connected to the top supporting shaft,
(viii) where the bottom supporting shaft is pivotally connected to the mid supporting shaft,
(ix) where the mid-cross member is pivotally connected to the top supporting shaft,
(c) a base; where the bottom supporting shaft is connected to the base,
(d) a spring; the spring comprising:
  (i) a first end; and
  (ii) a second end;
  (iii) where the first end of the spring is connected to the supporting structure,
  (iv) where the second end of the spring is connected to the frame,
(e) where the effort end of the front release lever is offset from the front assembly,
(f) where the load end of the front release lever is located to strike the effort end of the mid release lever,
(g) where the load end of the side release lever is located to strike the load end of the mid release lever,
(h) where the load end of the front release lever strikes the effort end of the mid release lever when the effort end of the front release lever is actuated,
(i) where the spring pivots the mid-cross member over the top supporting shaft when the mid release lever is struck by the front release lever or the side release lever, unfixing the load end of the mid release lever from the catch, to allow the mid-cross member to rotate.

10. The improved cattle roping training dummy described in claim 9,
  (a) wherein the mid release lever further comprises one or more hollow cylinders;
  (b) where each of the hollow cylinders is connected to the mid release lever,
  (c) where the pivot hole of the mid release lever and the hollow cylinders are concentric to each other,
  (d) where the mid release lever shaft projects through each of the hollow cylinders.

11. The improved cattle roping training dummy described in claim 10, the base further comprising:
  (a) a plurality of wheels;
  (b) a housing; the housing comprising:
    (i) a recess;
    (ii) a top lid;
    (iii) where the wheels are pivotally connected to the housing to provide mobility to the cattle roping training dummy,
    (iv) where the top lid is pivotaly connected to the housing.

12. The improved cattle roping training dummy described in claim 11, the base further comprising:
  (a) a left mount;
  (b) a right mount;
  (c) a first means to lock frame to base;

(d) a second means to lock frame to base;
(e) where the left mount and the right mount are connected to the base,
(f) where the first means to lock frame to base is connected to the left mount,
(g) where the second means to lock frame to base is connected to the right mount,
(h) where the frame is secured to the base by the first means to lock frame and the second means to lock frame.

13. 1) The improved cattle roping training dummy described in claim 10 further comprising:
    (a) a means to actuate side release lever;
    (b) where the means to actuate side release lever is connected to the effort end of the side release lever.

14. The improved cattle roping training dummy described in claim 13,
    (a) wherein the means to actuate side release lever comprises:
        (i) a mechanical cable assembly, the mechanical cable assembly comprising:
            (1) a first end; and
            (2) a second end;
        (ii) a pedal;
        (iii) where the pedal is connected to the second end of the mechanical cable assembly,
        (iv) where the first end of the mechanical cable is connected to the effort end of the side release lever.

15. The improved cattle roping training dummy described in claim 13, the base further comprising:
    (a) a left mount;
    (b) a right mount;
    (c) a first means to lock frame to base;
    (d) a second means to lock frame to base;
    (e) where the left mount and the right mount are connected to the base,
    (f) where the first means to lock frame to base is connected to the left mount,
    (g) where the second means to lock frame to base is connected to the right mount,
    (h) where the frame can be secured to the base by the first means to lock frame and the second means to lock frame.

16. An enhanced cattle roping training dummy comprising:
    (a) a frame; the frame comprising:
        (i) a front release lever; the front release lever comprising: an effort end and a load end;
        (ii) a left side member; the left side member comprising:
            (1) a front end; and
            (2) a back end;
        (iii) a right side member; the right side member comprising:
            (1) a front end; and
            (2) a back end;
        (iv) a front assembly;
            (1) where the front release lever is pivotally connected to the front assembly,
            (2) where the front end of the left side member is connected to the front assembly,
            (3) where the front end of the right member is connected to the front assembly,
        (v) a mid assembly, the mid assembly comprising:
            (1) a mid-cross member; the mid-cross member comprising: a left end and a right end;
            (2) a rotation limiting plate;
            (3) where the rotation limiting plate is connected to the mid-cross member,
            (4) where the left end of the mid-cross member is connected to the left side member, and
            (5) where the right end of the mid-cross member is connected to the right side member,
        (vi) a mid release lever; the mid release lever comprising: an effort end and a load end;
            (1) where the mid release lever is pivotally connected to the left side member and the right side member,
        (vii) a back assembly; the back assembly comprising:
            (1) a back cross member; the back cross member comprising:
                (a) a left end;
                (b) a right end;
            (2) a right leg;
            (3) a left leg;
            (4) a first means to rotate the back cross member;
            (5) a second means to rotate the back cross member;
            (6) where the right leg is connected to the right end of the back cross member,
            (7) where the left leg is connected to the left end of the back cross member,
            (8) where the first means to rotate the back cross member connects the back end of the left side member to the left end of the back cross member,
            (9) where the second means to rotate the back cross member connects the back end of the right side member to the right end of the back cross member,
    (b) a supporting structure; the supporting structure comprising:
        (i) a top supporting shaft;
        (ii) a mid supporting shaft;
        (iii) a bottom supporting shaft;
        (iv) a platform; the platform comprising:
            (1) a catch;
            (2) a side release lever; the side release lever comprising an effort end and a load end;
            (3) where the platform is connected to the top supporting shaft,
            (4) where the side release lever is pivotally connected to the platform,
            (5) where the catch is connected to the platform,
            (6) where the catch may fix in place the load end of the mid release lever, to prevent rotational motion of mid-cross member over the top supporting shaft,
        (v) a first lock; where the first lock secures the bottom supporting shaft to the mid supporting shaft,
        (vi) a second lock; where the second lock secures the mid supporting shaft to the top supporting shaft,
        (vii) where the mid supporting shaft is pivotally connected to the top supporting shaft,
        (viii) where the bottom supporting shaft is pivotally connected to the mid supporting shaft,
        (ix) where the mid-cross member is pivotally connected to the top supporting shaft,
    (c) a base; where the bottom supporting shaft is connected to the base,
    (d) a spring, the spring comprising:
        (i) a first end; and
        (ii) a second end;
        (iii) where the first end of the spring is connected to the supporting structure, (iv) where the second end of the spring is connected to the frame, (e) where the effort end of the front release lever is offset from the front assembly, (f) where the load end of the front release lever is located to strike the effort end of the mid release lever, (g) where the load end of the side release lever is located to strike the load end of the mid release lever, (h) where the load end of the front release lever strikes the effort end of the mid release lever when the effort end of the front release lever is actuated, (i) where the spring pivots the mid-cross member over the top supporting shaft when the mid release lever is struck by to front release lever or the side release lever, unfixing the load end of the mid release lever from the catch, to allow the mid-cross member to rotate.

17. The enhanced cattle roping training dummy described in claim 16, the base further comprising:
(a) a plurality of wheels; and
(b) a housing, the housing comprising:
   (i) a recess;
   (ii) a top lid;
   (iii) where the wheels are pivotally connected to the housing to provide mobility to the cattle roping training dummy,
   (iv) where the top lid is pivotally connected to the housing.

18. The enhanced cattle roping training dummy described in claim 17 further comprising:
(a) a means to actuate side release lever;
(b) where the means to actuate side release lever is connected to the effort end of the side release lever.

19. The cattle roping training dummy described in claim 18, the base further comprising:
(a) a left mount;
(b) a right mount;
(c) a first means to lock frame to base;
(d) a second means to lock frame to base;
(e) where the left mount and the right mount are connected to the base,
(f) where the first means to lock frame to base is connected to the left mount,
(g) where the second means to lock frame to base is connected to the right mount,
(h) where the frame can be secured to the base by the first means to lock frame and the second means to lock frame.

20. The enhanced cattle roping training dummy described in claim 19,
(a) wherein the front assembly comprises two or more members;
(b) where one of the members is shaped to resemble cattle horns.

* * * * *